June 21, 1966  S. A. PAOLI  3,256,555
APPARATUS FOR REMOVING MEAT FROM BONES
Filed Sept. 6, 1963  22 Sheets-Sheet 1

BEFORE

BEFORE

AFTER

AFTER

INVENTOR.
STEPHEN A. PAOLI
BY
Wolfe, Hubbard, Voit & Osann
ATTYS.

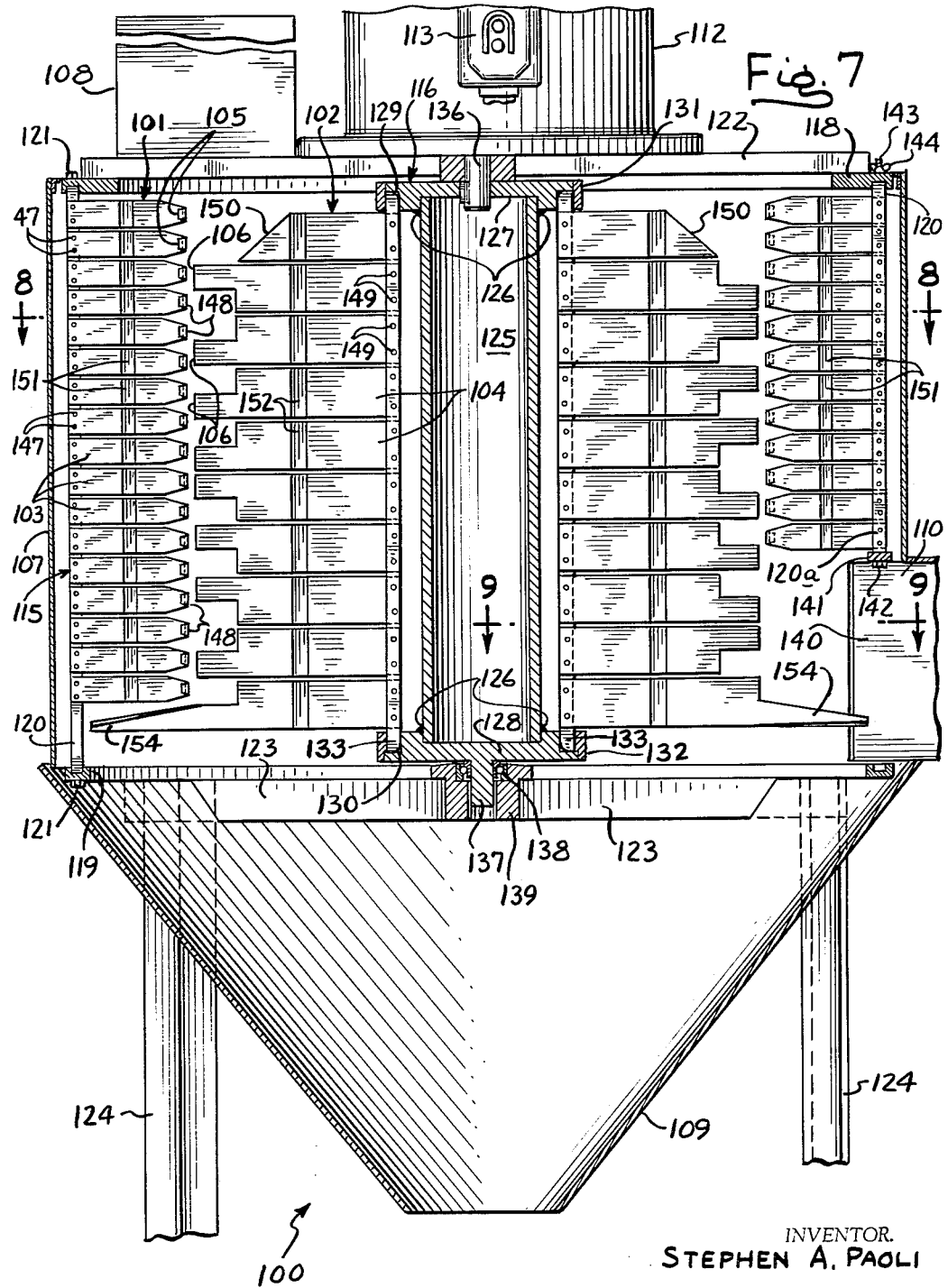

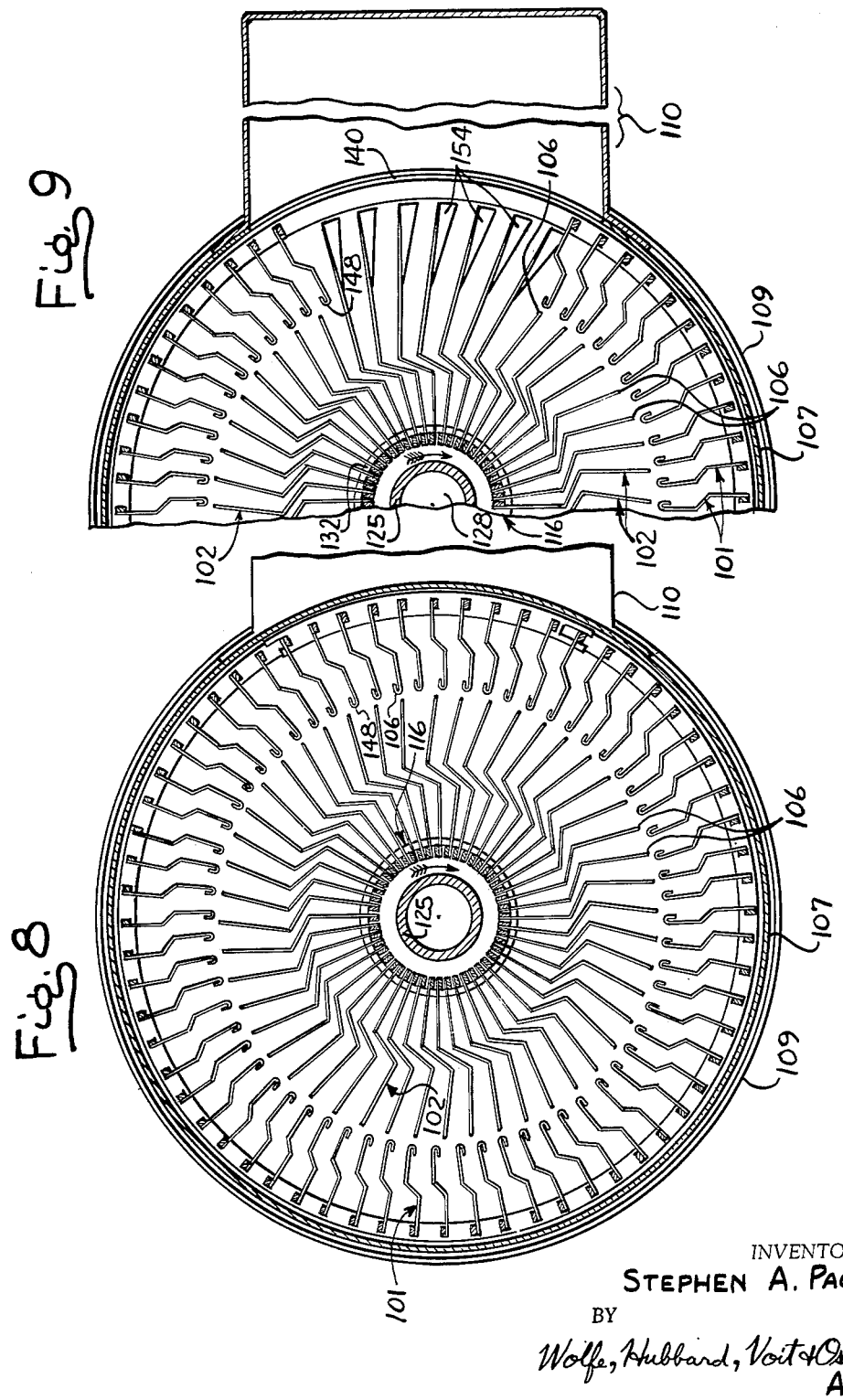

June 21, 1966 S. A. PAOLI 3,256,555
APPARATUS FOR REMOVING MEAT FROM BONES
Filed Sept. 6, 1963 22 Sheets-Sheet 4
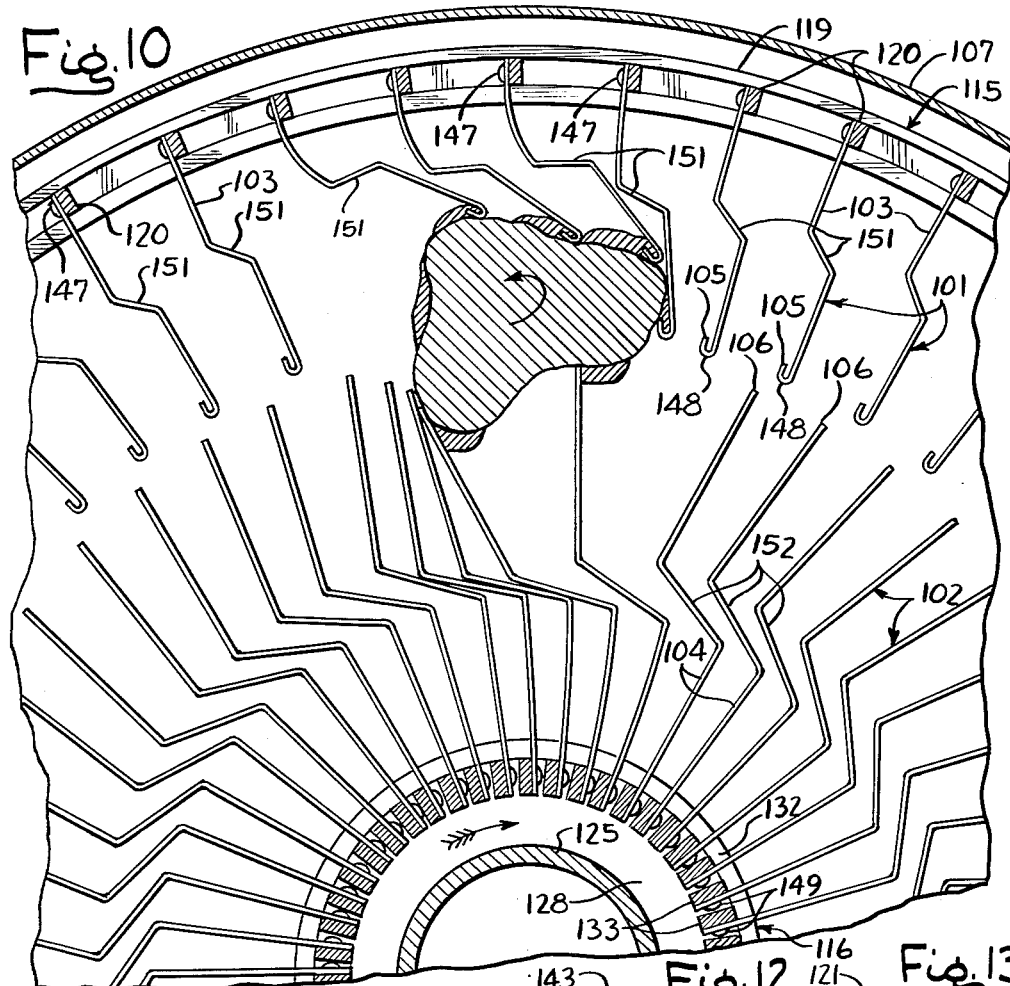
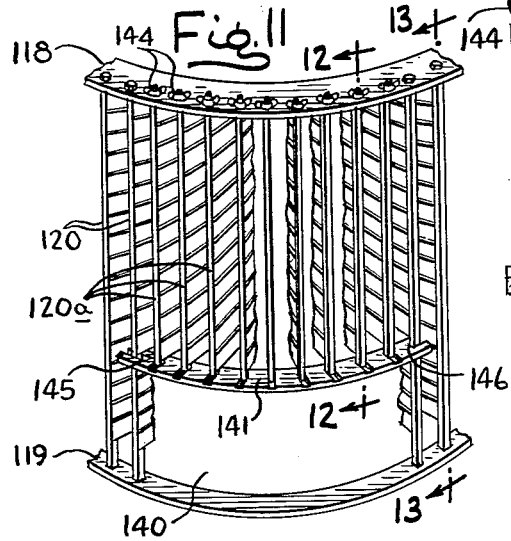
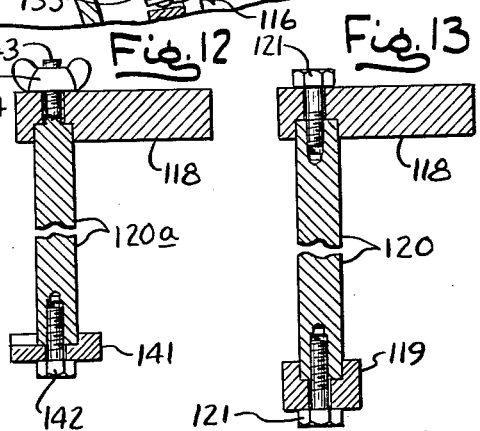
INVENTOR.
STEPHEN A. PAOLI
BY
Wolfe, Hubbard, Voit & Osann
ATTYS

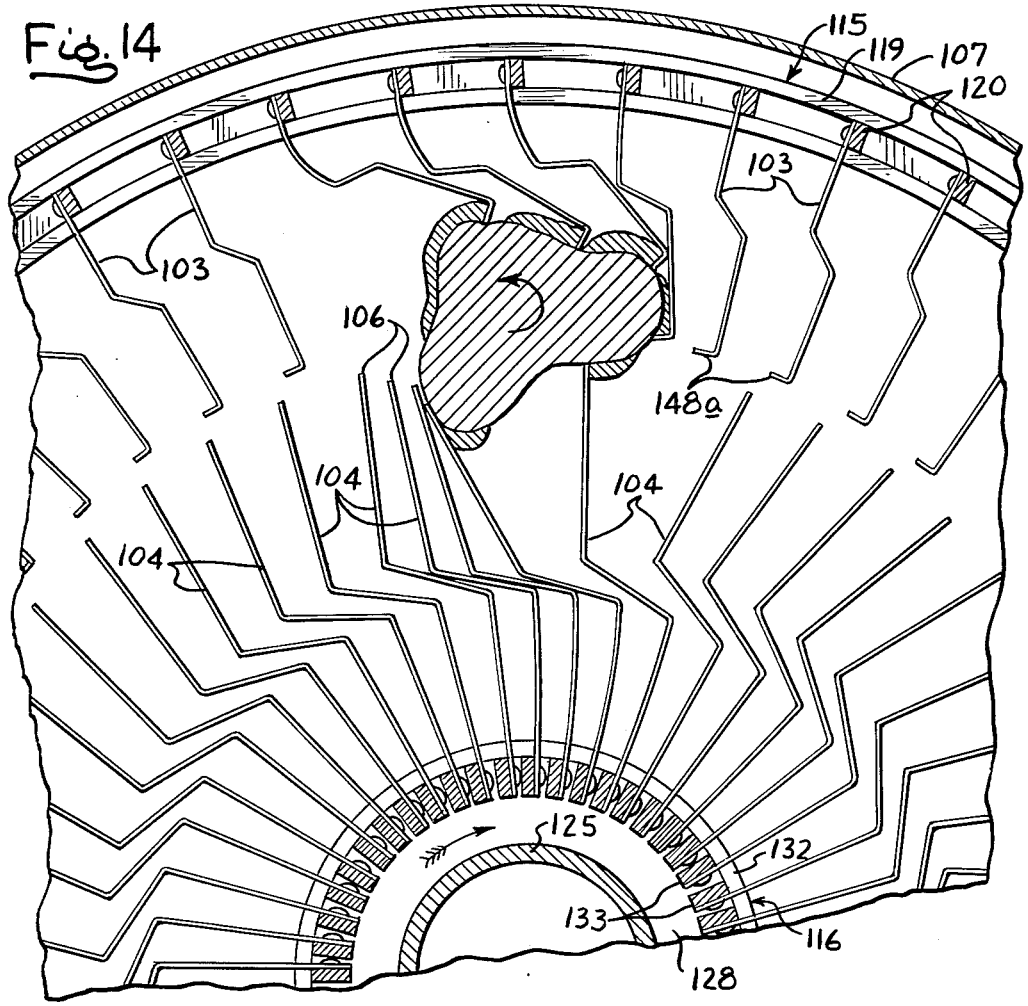
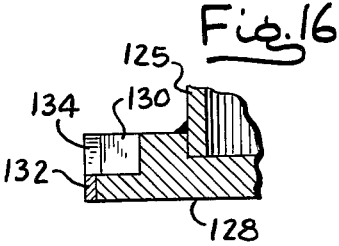
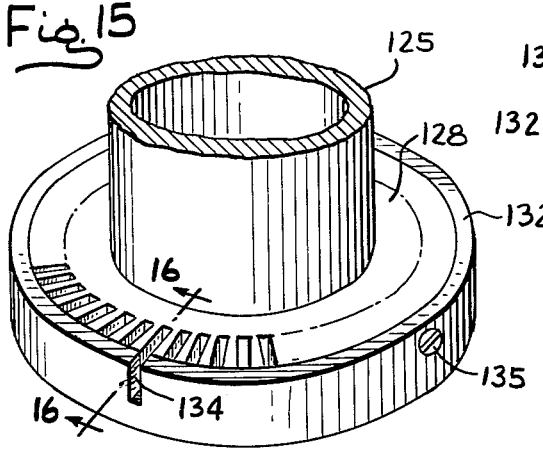
Fig. 14
Fig. 15
Fig. 16
INVENTOR.
STEPHEN A. PAOLI
BY Wolfe, Hubbard, Voit & Osann
ATTYS.

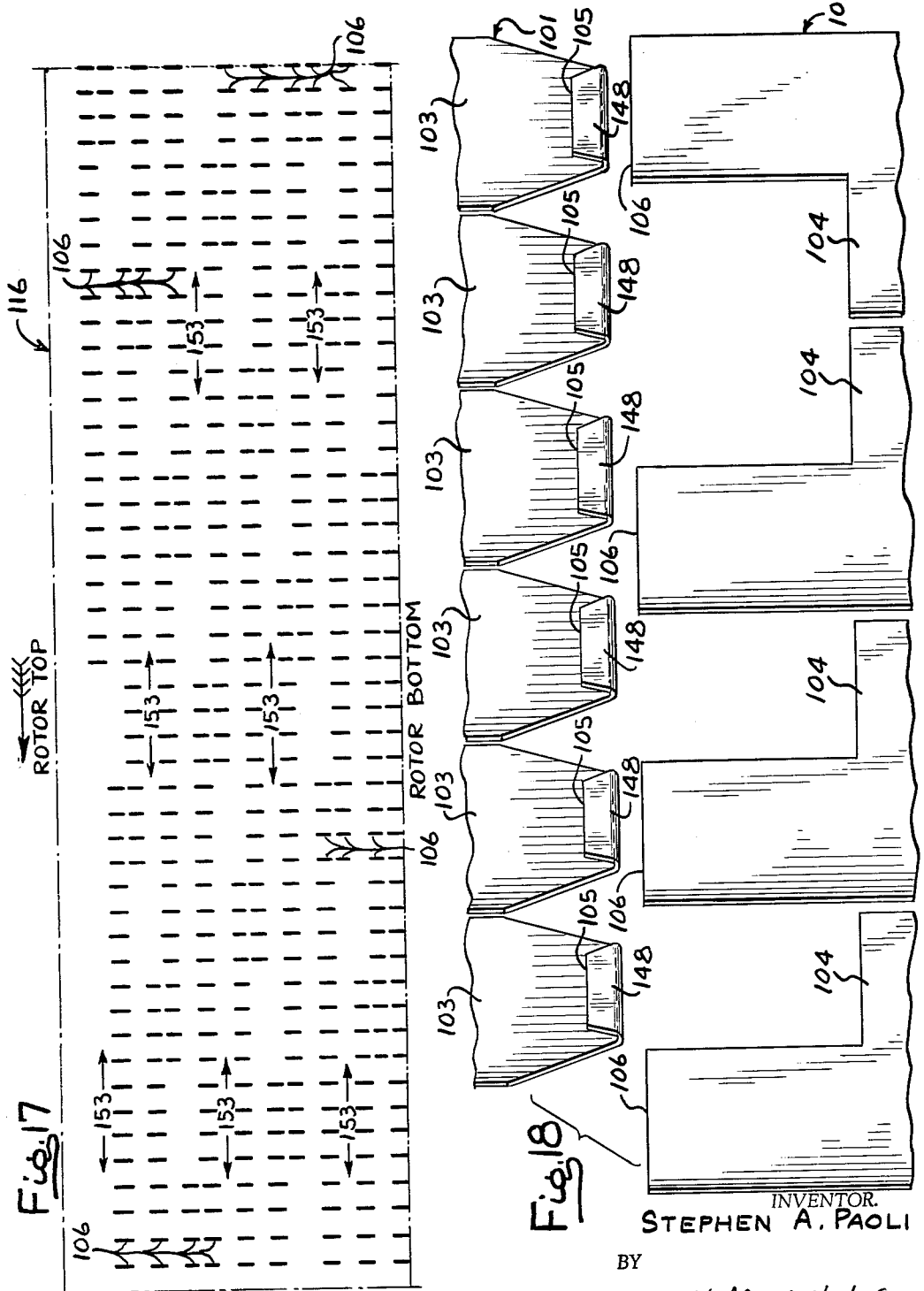

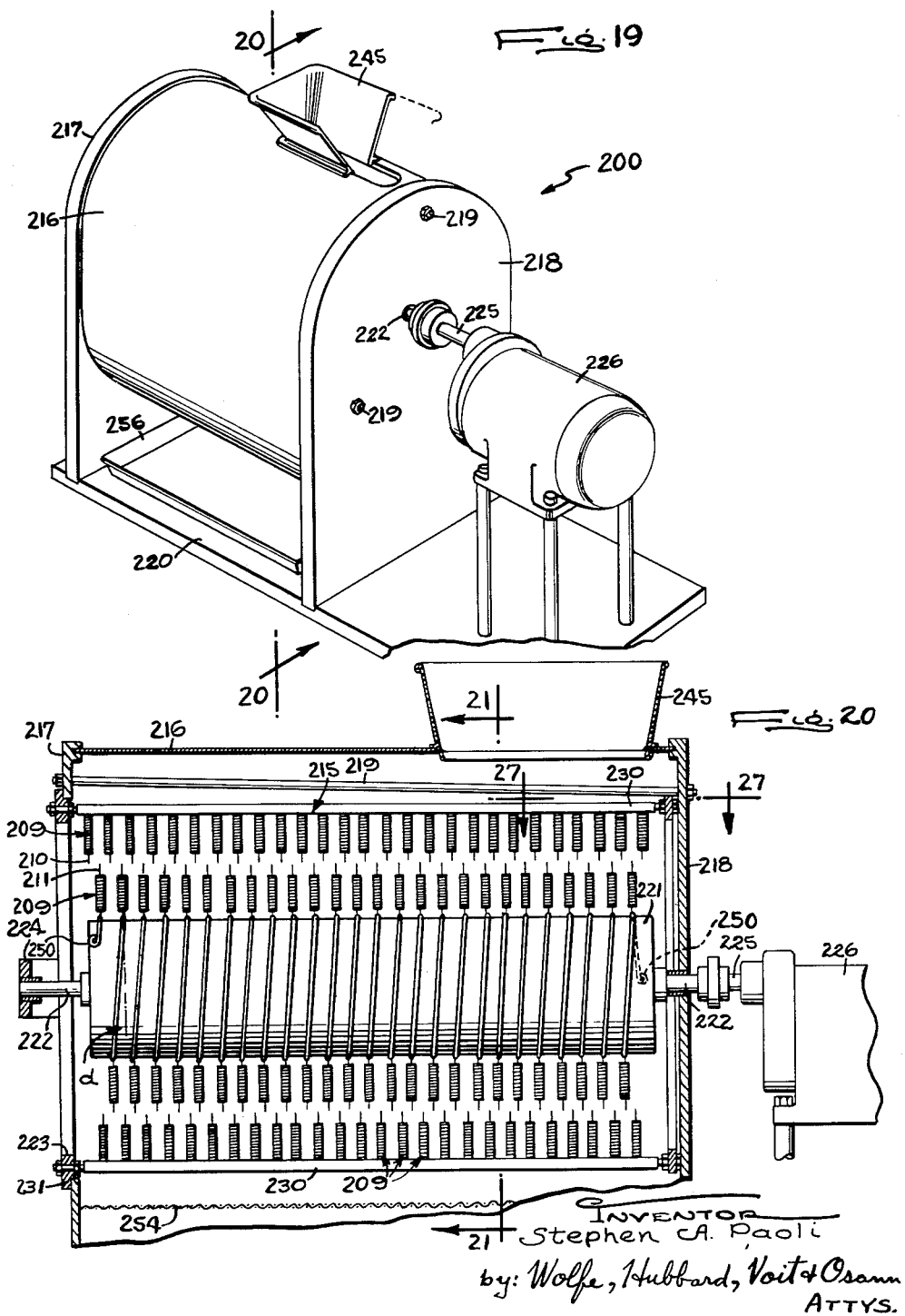

June 21, 1966    S. A. PAOLI    3,256,555
APPARATUS FOR REMOVING MEAT FROM BONES
Filed Sept. 6, 1963    22 Sheets-Sheet 8
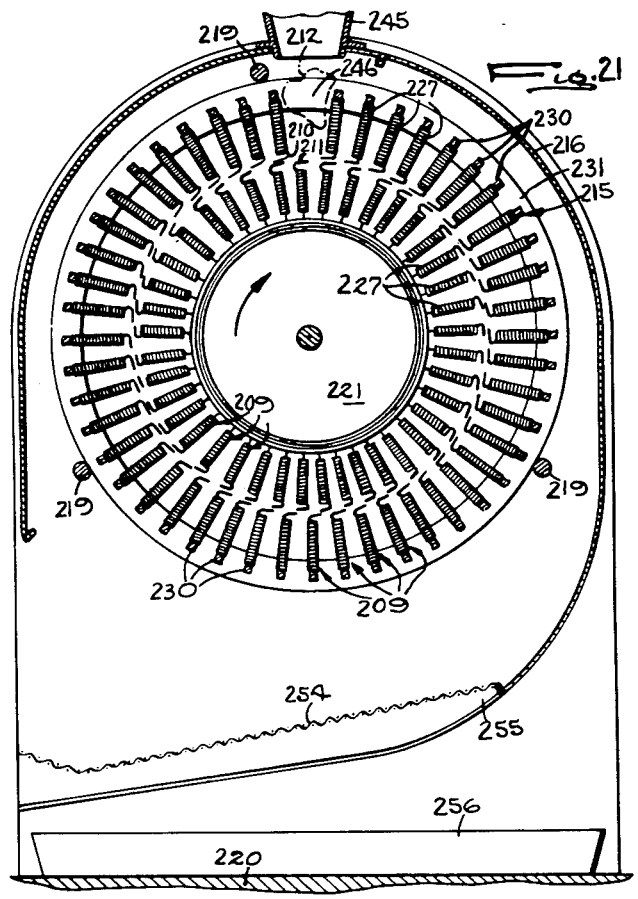
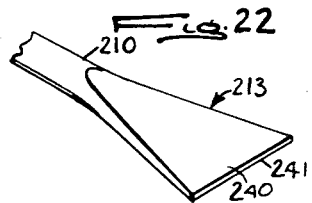
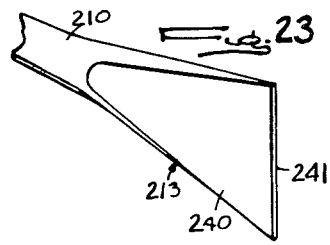
INVENTOR.
STEPHEN A. PAOLI
BY
Wolfe, Hubbard, Voit & Osann
ATTYS.

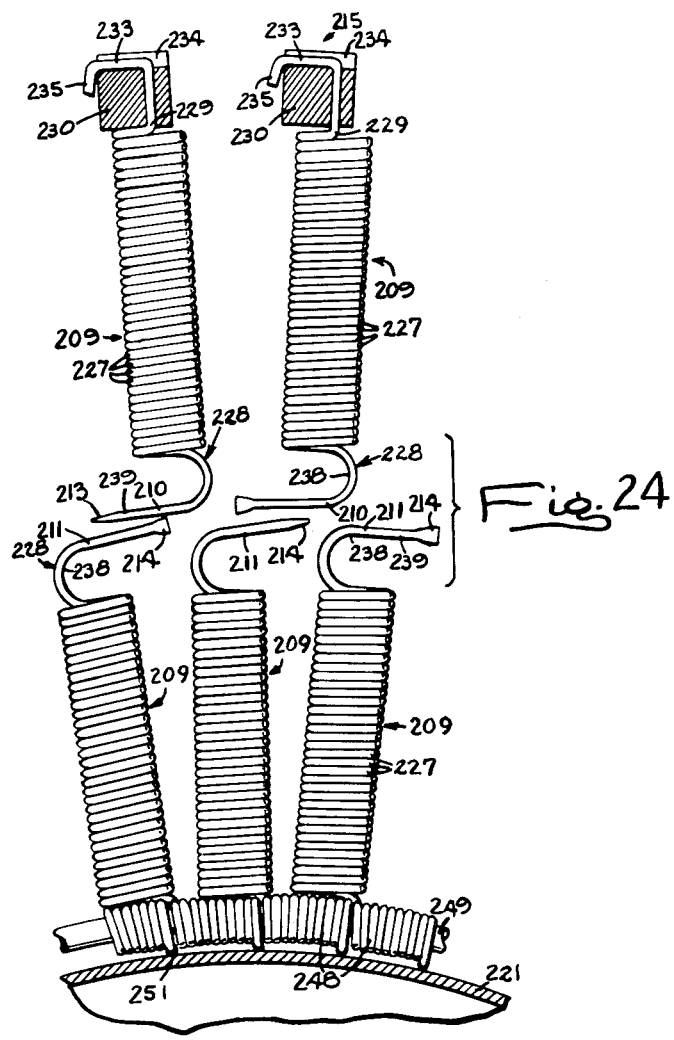
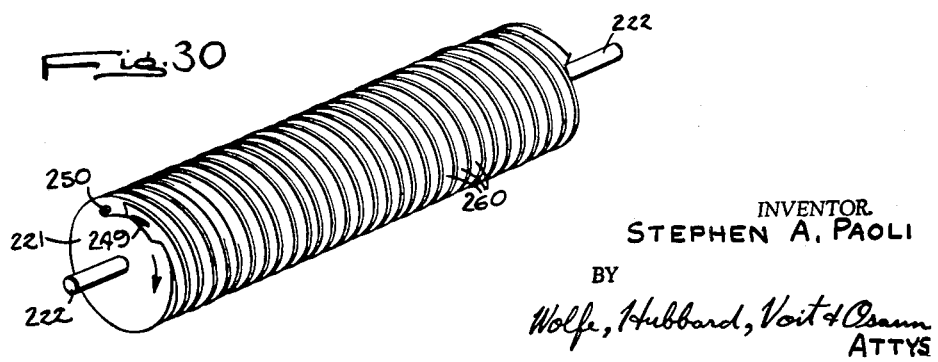

June 21, 1966 S. A. PAOLI 3,256,555
APPARATUS FOR REMOVING MEAT FROM BONES
Filed Sept. 6, 1963 22 Sheets-Sheet 11
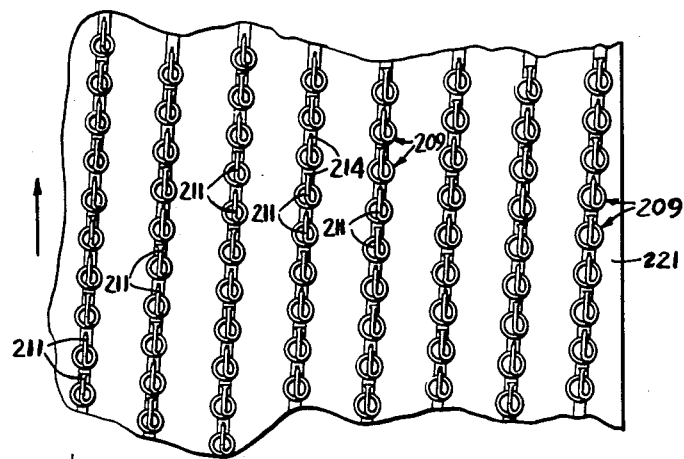
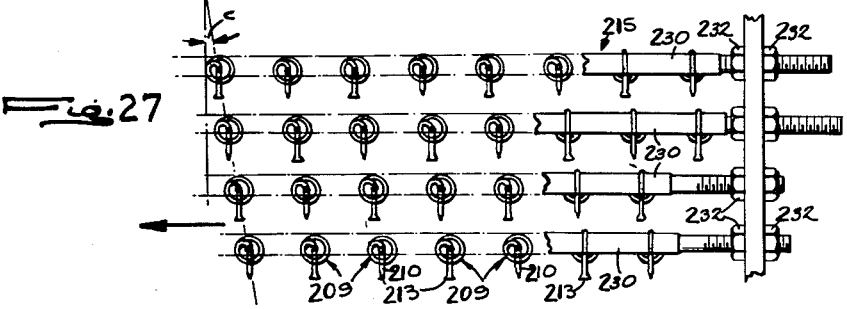
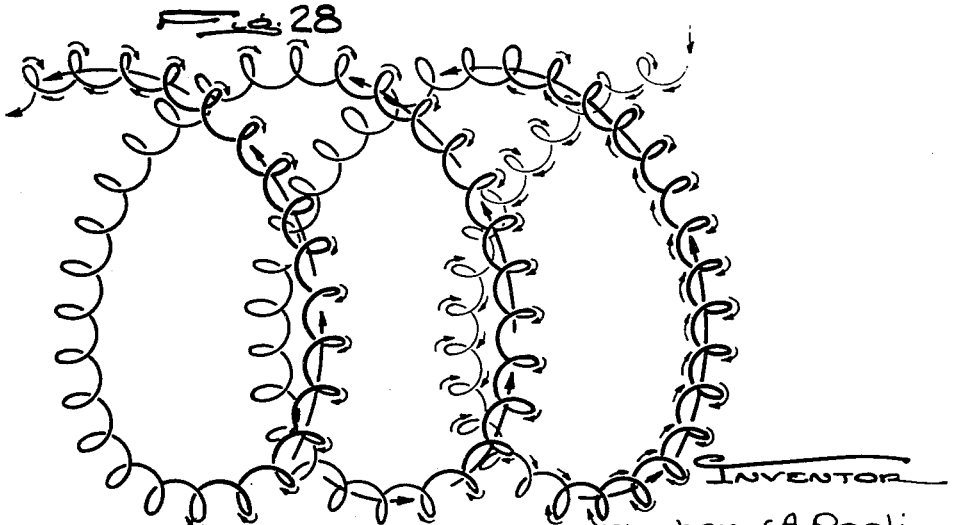
INVENTOR
Stephen A. Paoli
by: Wolfe, Hubbard, Voit & Osann
ATTYS.

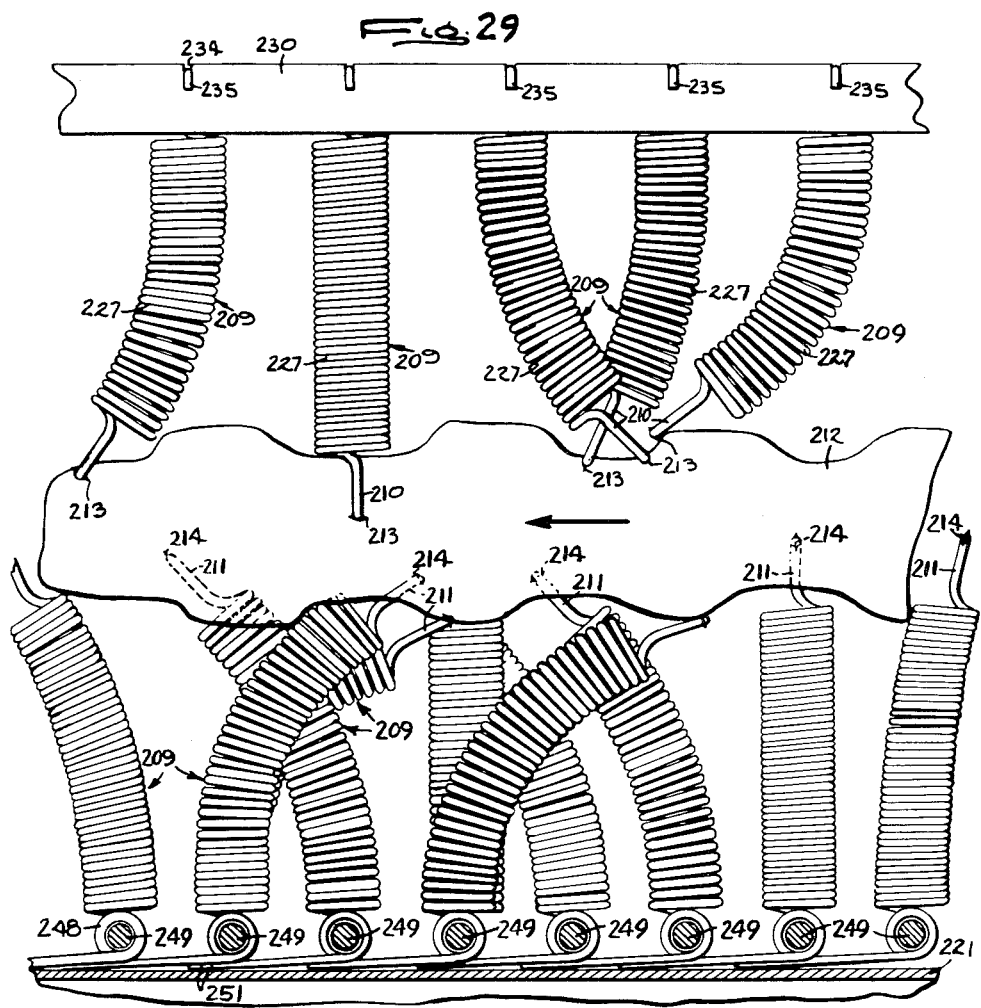

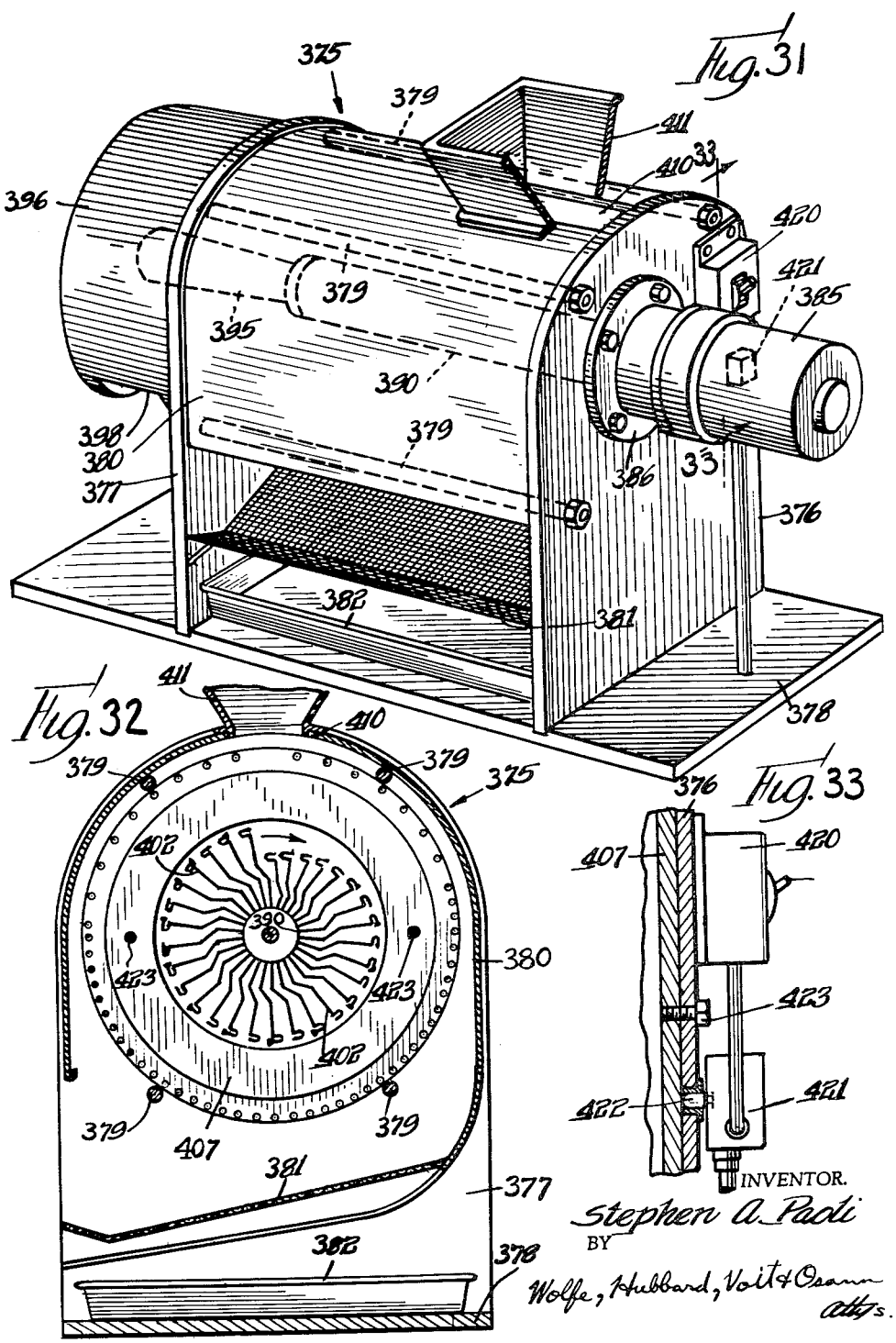

June 21, 1966 S. A. PAOLI 3,256,555
APPARATUS FOR REMOVING MEAT FROM BONES
Filed Sept. 6, 1963 22 Sheets-Sheet 14

INVENTOR.
Stephen A. Paoli
BY
Wolfe, Hubbard, Voit & Osann
attys

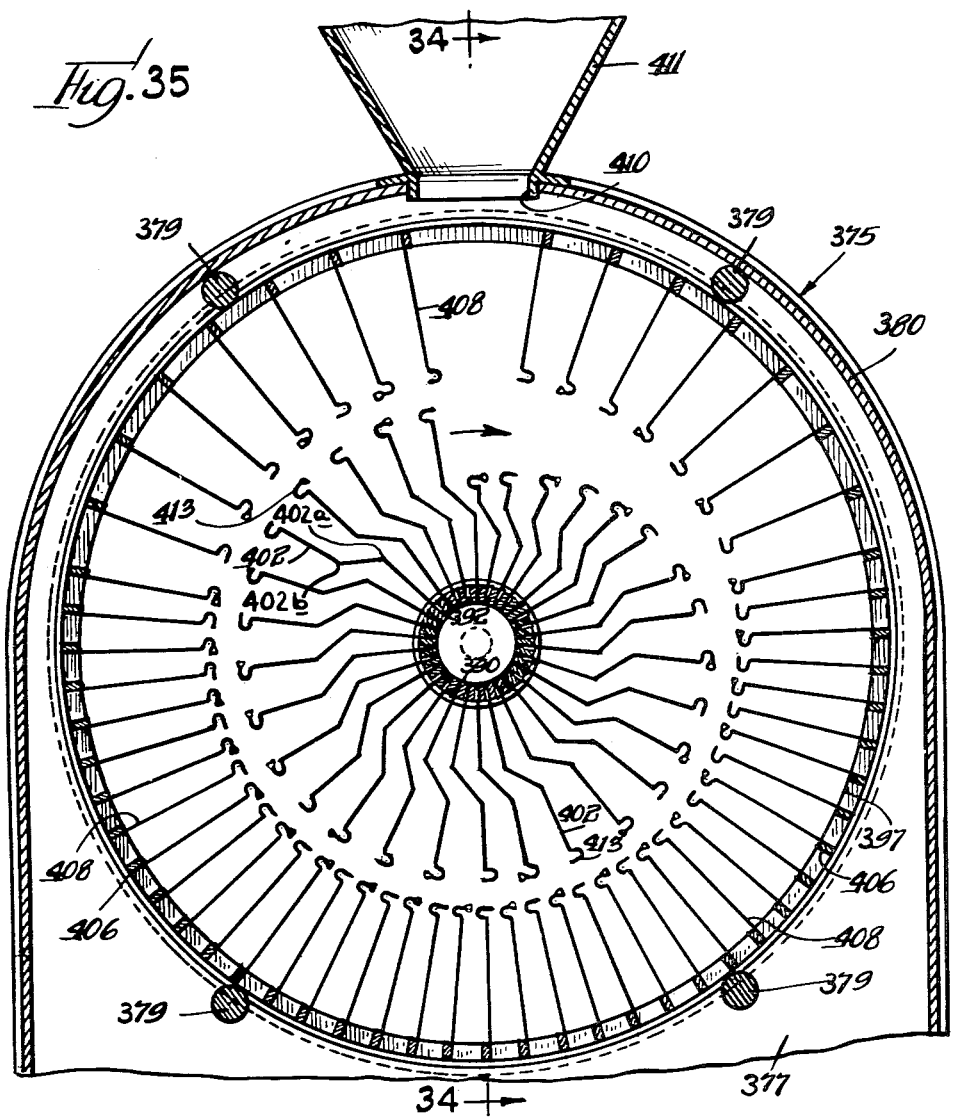

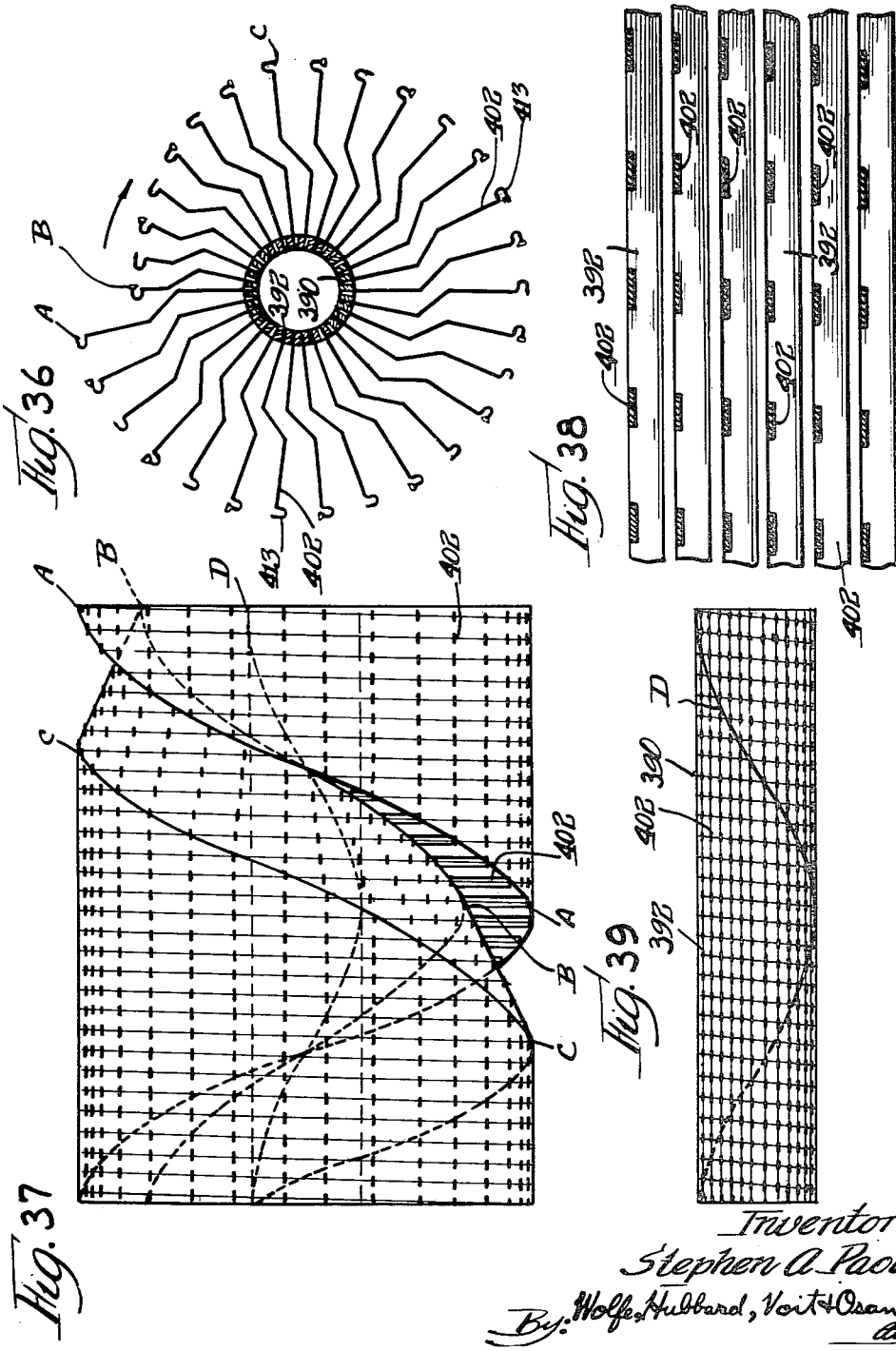

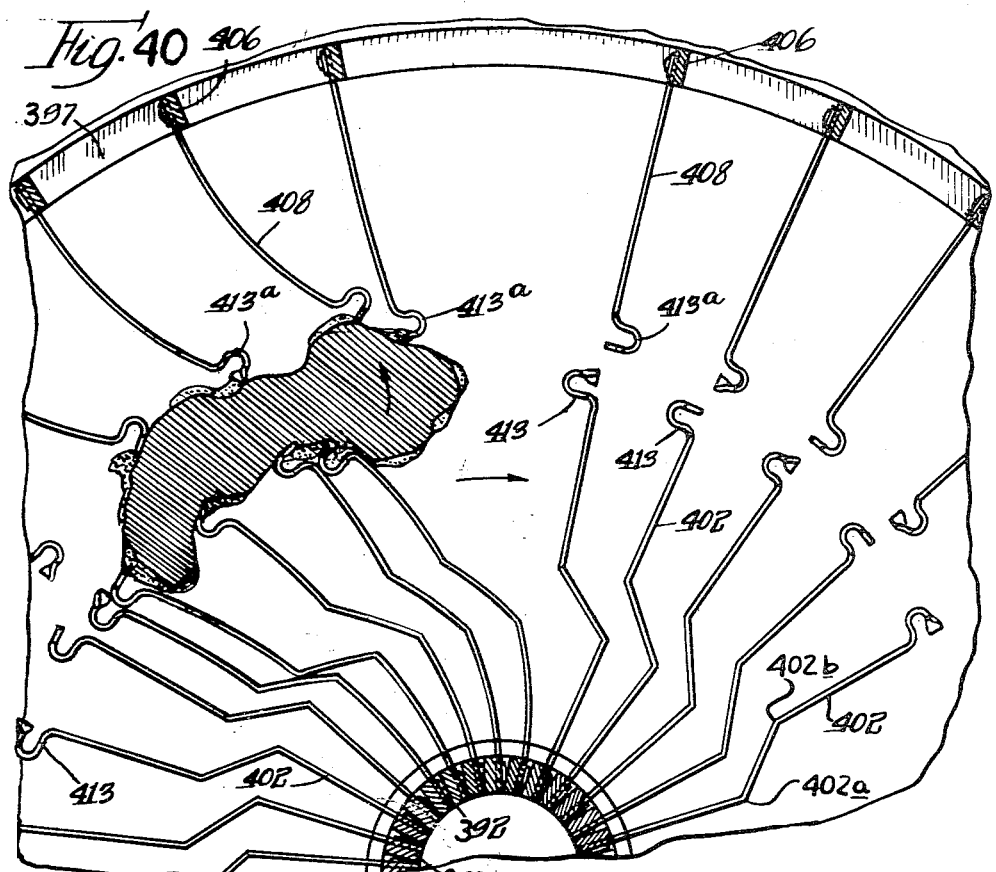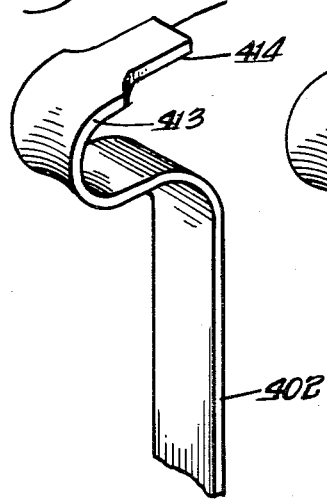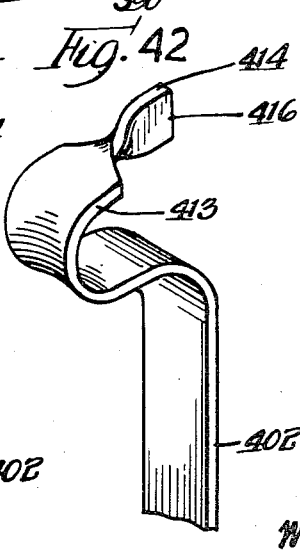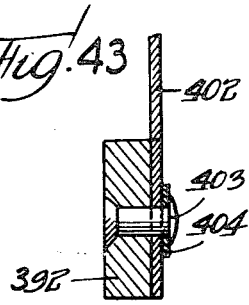

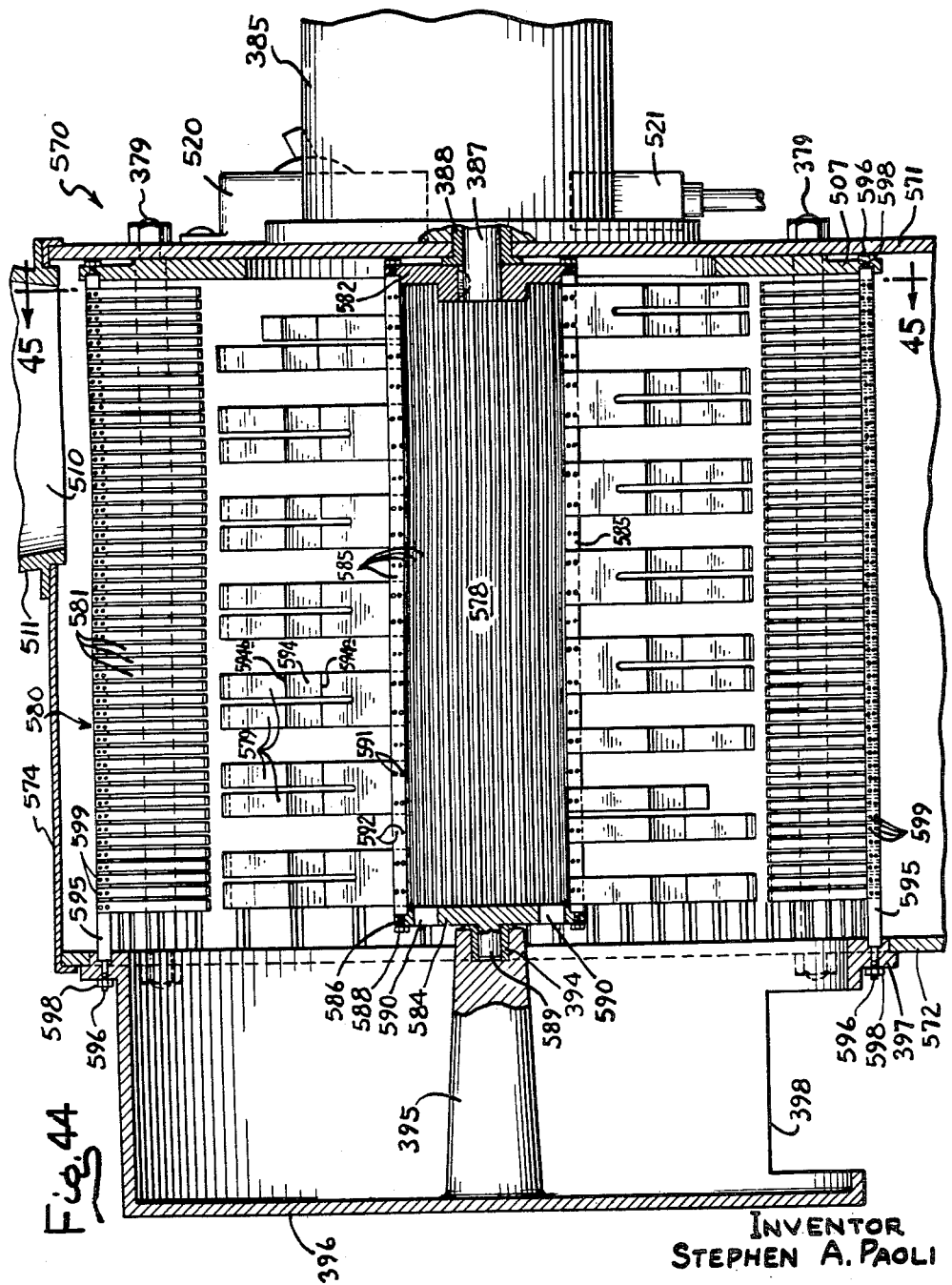

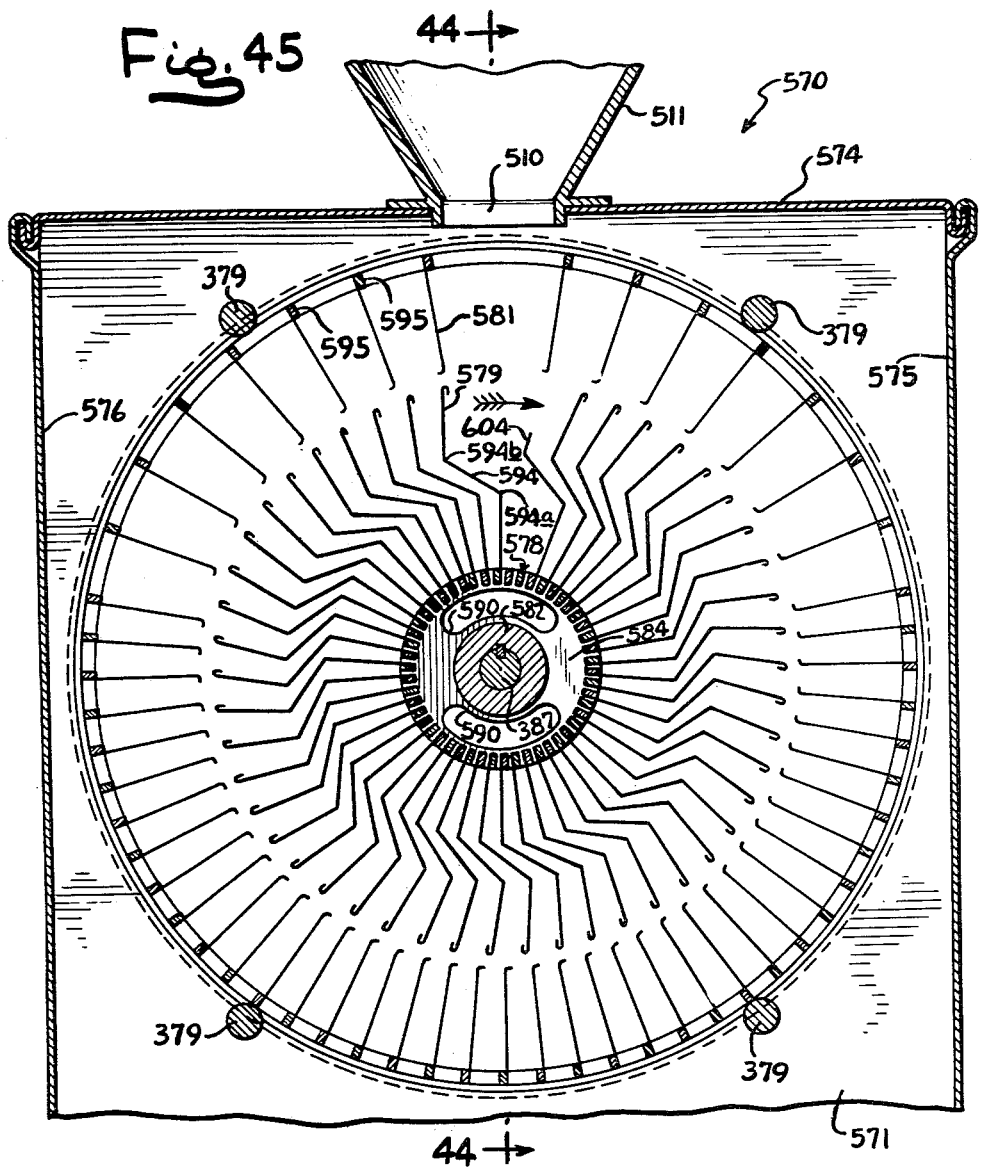

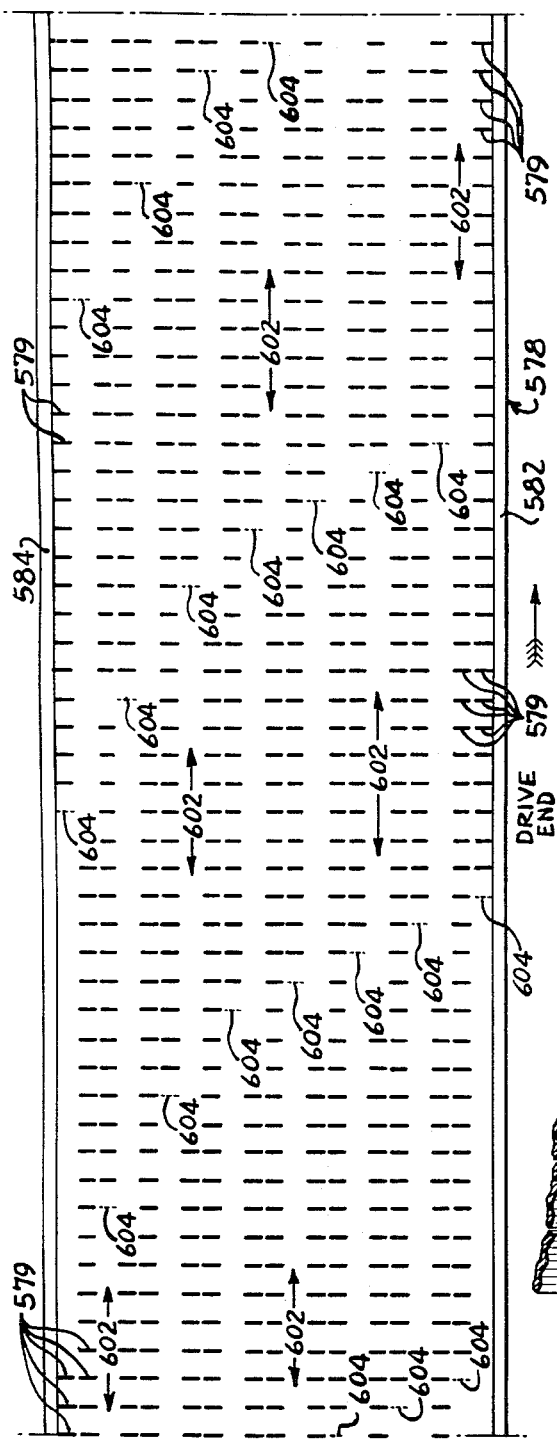
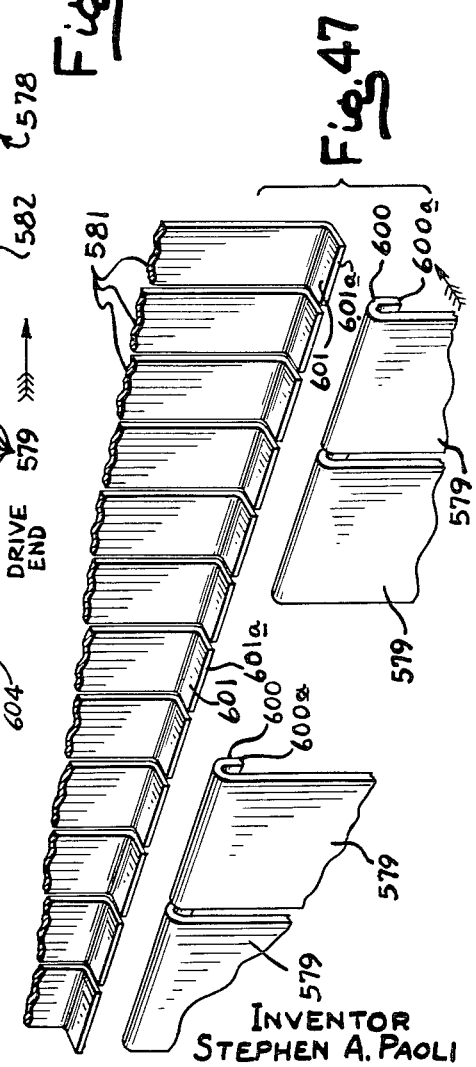

June 21, 1966  S. A. PAOLI  3,256,555
APPARATUS FOR REMOVING MEAT FROM BONES
Filed Sept. 6, 1963  22 Sheets-Sheet 21
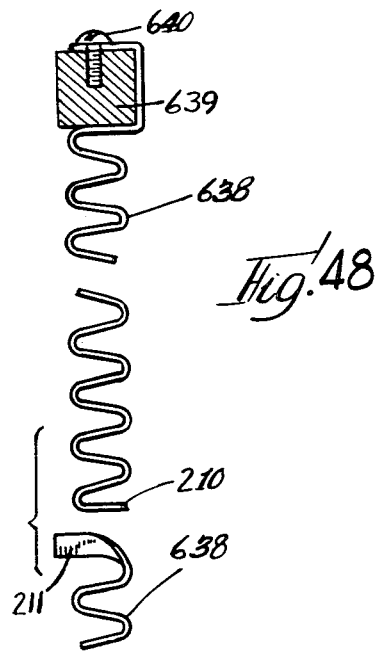
Fig. 48
Fig. 49
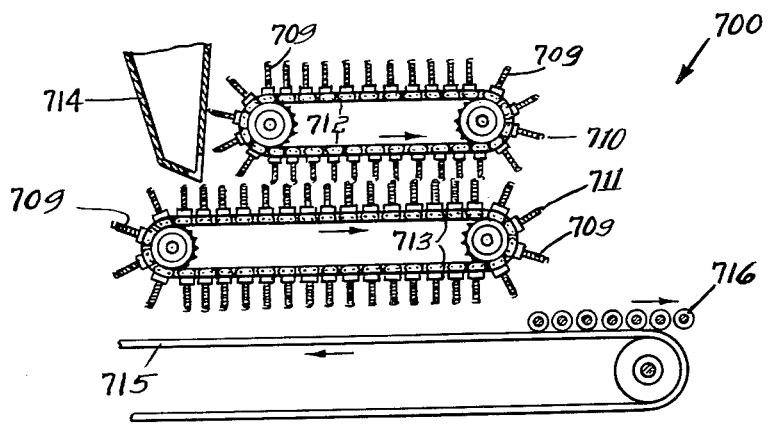
INVENTOR.
Stephen A. Paoli
BY
Wolfe, Hubbard, Voit & Osann
Attys.

June 21, 1966  S. A. PAOLI  3,256,555
APPARATUS FOR REMOVING MEAT FROM BONES
Filed Sept. 6, 1963  22 Sheets-Sheet 22
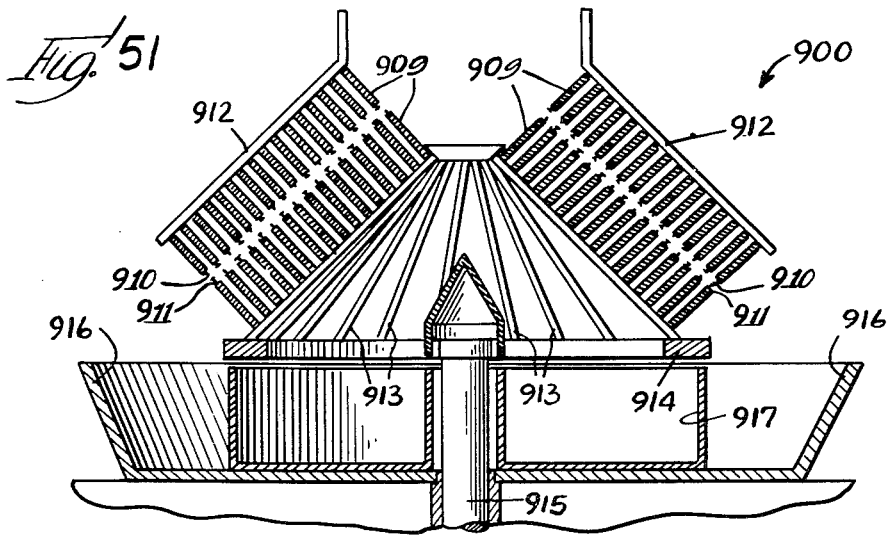
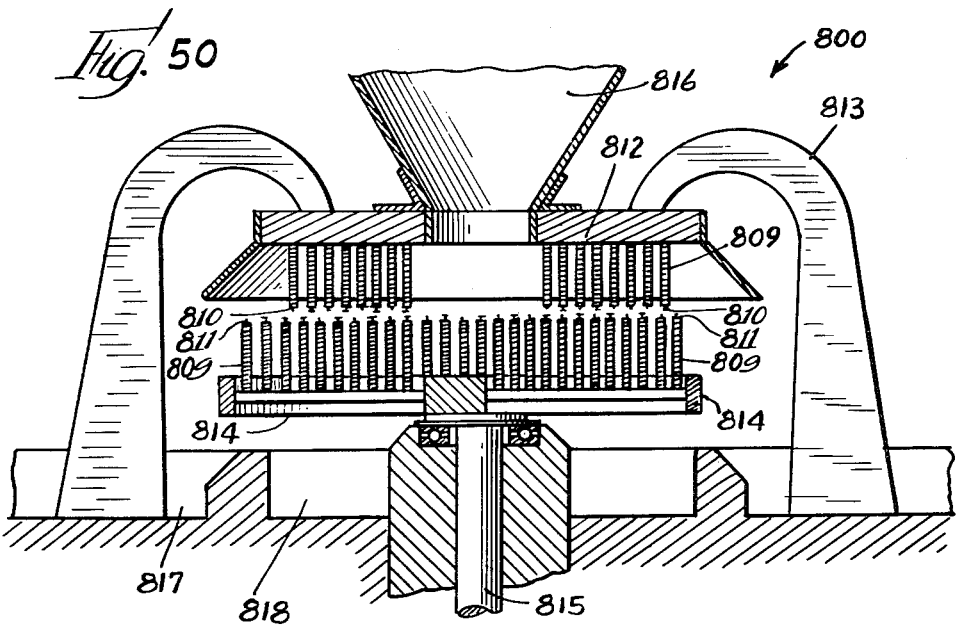
INVENTOR.
Stephen A. Paoli
BY
Wolfe, Hubbard, Voit & Osann
attys

United States Patent Office 3,256,555
Patented June 21, 1966

3,256,555
APPARATUS FOR REMOVING MEAT
FROM BONES
Stephen A. Paoli, 821 W. Chester Drive, Rockford, Ill.
Filed Sept. 6, 1963, Ser. No. 307,148
54 Claims. (Cl. 17—1)

The present invention pertains to the removal of meat from bones, and this application is a continuation-in-part of my copending application Serial No. 101,038, filed March 30, 1961, as a continuation-in-part of my earlier filed applications Serial No. 685,042, filed September 19, 1957, and Serial No. 494,160 filed March 14, 1955, now abandoned.

One of the major problems in the butchering and meat packing industry heretofore has been the removal of meat from bones and the salvaging of the meat which remains on the bones following ordinary deboning operations. Bones subjected to conventional deboning methods usually carry a relatively large amount of residual meat which may be used for making hamburger, lunch meat and similar products. Such meat, being almost all lean, is particularly valuable for these purposes. It has been customary to cut and remove from the bones manually as much of this residual meat as possible. This involves skilled, high cost labor manually wielding deboning knives. The procedure is time consuming, expensive, and even when completed, considerable valuable meat still remains on the bones.

The principal object of this invention is to provide a method and apparatus for automatically removing meat from bones. The invention may be utilized for removing the remainder of the meat from the bones following hand cutting or trimming of the meat with deboning knives, thus salvaging such meat. The invention may also be utilized for removing all of the meat from the bones before, as well as after, the manual deboning operation, thus eliminating the necessity for hand trimming or cutting and providing a major step toward automation in the packing and butchering industry.

Another object is to provide a machine for removing meat from a wide variety of bones wherein each bone is subjected to yieldable cleaning elements which impart to it a random tumbling motion exposing substantially its entire area to the action of the cleaning elements, and wherein the bone is simultaneously moved along a generally predetermined path through and out of the cleaning zone as an incident to exposure to the cleaning elements.

A further object is to provide a machine for automatically removing meat from bones wherein each bone is passed from a loading zone to a cleaning zone, tumbled at random by yieldable cleaning elements on an individual shifting axis disposed generally longitudinally of the bone, and simultaneously moved bodily through the cleaning zone to a bone discharge zone as an incident to exposure to the cleaning elements, the meat removed in the cleaning zone being delivered to a collecting zone.

Another object of this invention is to provide a power driven machine to remove automatically substantially all of the meat from all parts of bones fed into the machine and to separate the meat from the bones.

A further object of the invention is to provide a machine of the character set forth and having relatively movable cleaning elements arranged in sets in such a manner as to simultaneously clean and feed the bones through the machine as an incident to the relative movement between the sets of cleaning elements.

Still another object of this invention is to provide a bone cleaning machine having opposed sets of cutting, scraping and tearing elements which not only remove the meat from the bone surfaces but which also coact with each other in advancing each bone through and out of the machine.

A further object is to provide a machine of the foregoing type wherein the cleaning elements yield laterally and coact in a novel manner so as to accommodate bones which vary widely in size, shape, and composition.

The invention also resides in the novel construction and mounting of the cleaning elements which permits a wide range of yielding to accommodate bones of different sizes and shapes while providing proper stiffness for efficient cleaning of the bone surfaces and proper timing of the advance of the bones through the cleaning zone of the machine.

Other objects and advantages of the invention will become apparent from the following detailed description taken in connection with the accompanying drawings, in which:

FIG. 7 is an enlarged fragmentary vertical sectional view taken axially through the illustrative bone cleaning machine of FIG. 1.

FIGS. 8 and 9 are fragmentary horizontal sectional views through the machine, taken respectively in the planes of the lines 8—8 and 9—9 in FIG. 7 but on a slightly reduced scale.

Figure 1:
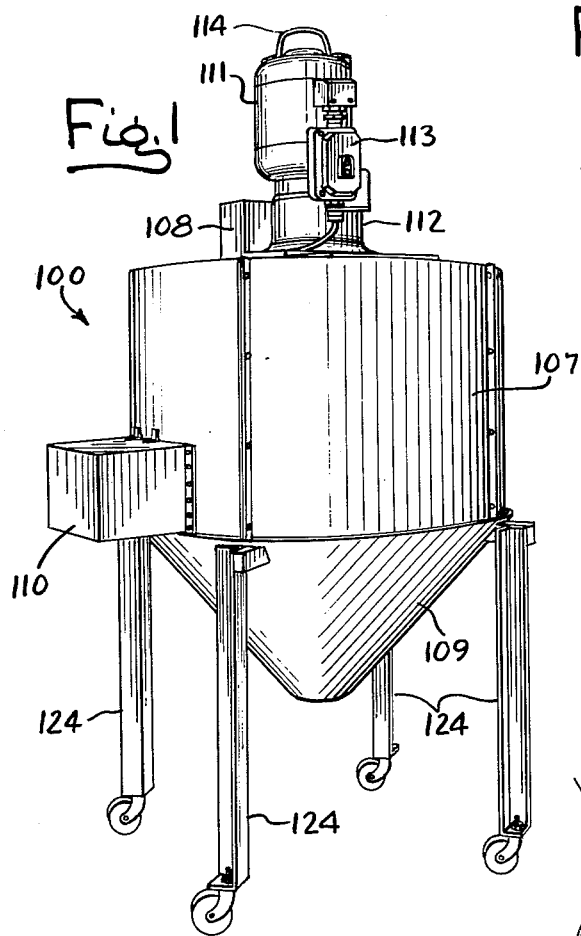
FIGURE 1 is a perspective view of one form of bone cleaning machine exemplifying the present invention and by means of which the method thereof may be practiced.

FIG. 10 is a further enlarged fragmentary horizontal sectional view through the rotor and stator of the machine of FIG. 1 and illustrating its bone cleaning action.

FIG. 11 is a fragmentary perspective view, on a somewhat reduced scale, showing a portion of the stator of the machine of FIG. 1 adjacent the bone discharge aperture.

FIGS. 12 and 13 are enlarged fragmentary sectional views taken respectively in the lines 12—12 and 13—13 of FIG. 11.

FIG. 14 is an enlarged fragmentary sectional view similar to FIG. 10 but showing slightly modified cleaning elements on the stator.

FIG. 15 is an enlarged fragmentary perspective view illustrating the lower end portion of the rotor of the machine of FIG. 1 but with the cleaning elements removed.

FIG. 16 is an enlarged fragmentary transverse sectional view taken in the plane of the line 16—16 of FIG. 15.

FIG. 17 is a diagrammatic developmental view of the outer periphery of the rotor of the machine of FIG. 1 showing the position and spacing of the cleaning elements thereon.

FIG. 18 is an enlarged fragmentary perspective view illustrating the projecting end portions of the cleaning elements of the rotor and stator of the machine shown in FIG. 1.

FIG. 19 is a fragmentary perspective view of another form of bone cleaning machine illustratively embodying the present invention.

FIG. 20 is an enlarged fragmentary vertical sectional view taken along the line 20—20 in FIG. 1.

FIG. 21 is a fragmentary sectional view taken in the plane of the line 21—21 in FIG. 20.

FIGS. 22 and 23 are enlarged fragmentary perspective views of certain cleaning elements or blades in the machine of FIG. 19.

FIG. 24 is an enlarged fragmentary vertical sectional view through a portion of the machine as shown in FIG. 21.

Figure 25:
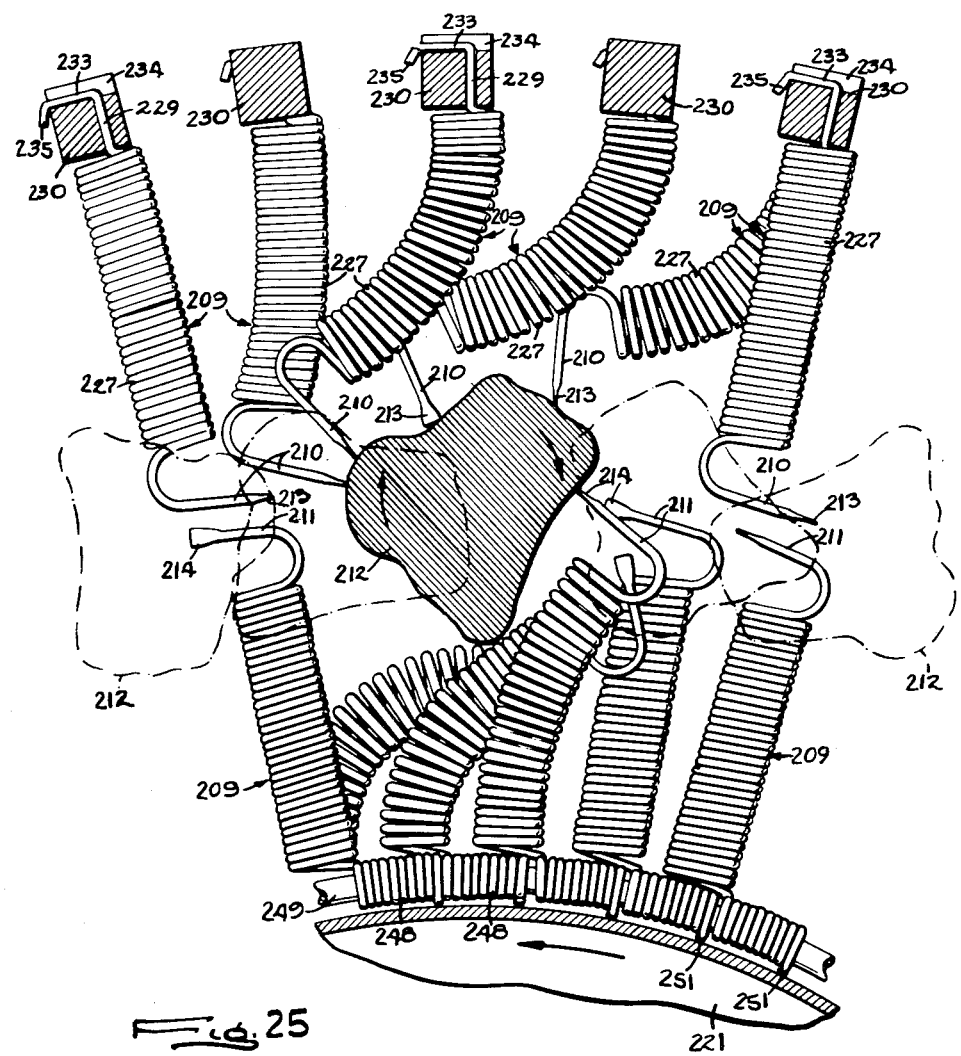

FIG. 25 is an enlarged fragmentary sectional view similar to FIG. 24 but illustrating the action of the cleaning elements in the machine.

FIG. 26 is an enlarged fragmentary developmental view illustrating a portion of the rotor of the machine shown in FIG. 20.

FIG. 27 is an enlarged fragmentary developmental view taken in the plane of the line 27—27 in FIG. 20.

FIG. 28 is a diagrammatic view illustrating the approximate motion and path of a bone while being cleaned in the machine of FIG. 19.

FIG. 29 is an enlarged view further illustrating the action of the cleaning elements of a machine as shown in FIG. 20.

FIG. 30 is a perspective view of a modified form of rotor.

FIG. 31 is a perspective view of another illustrative form of bone cleaning machine also embodying the invention.

Figure 34:
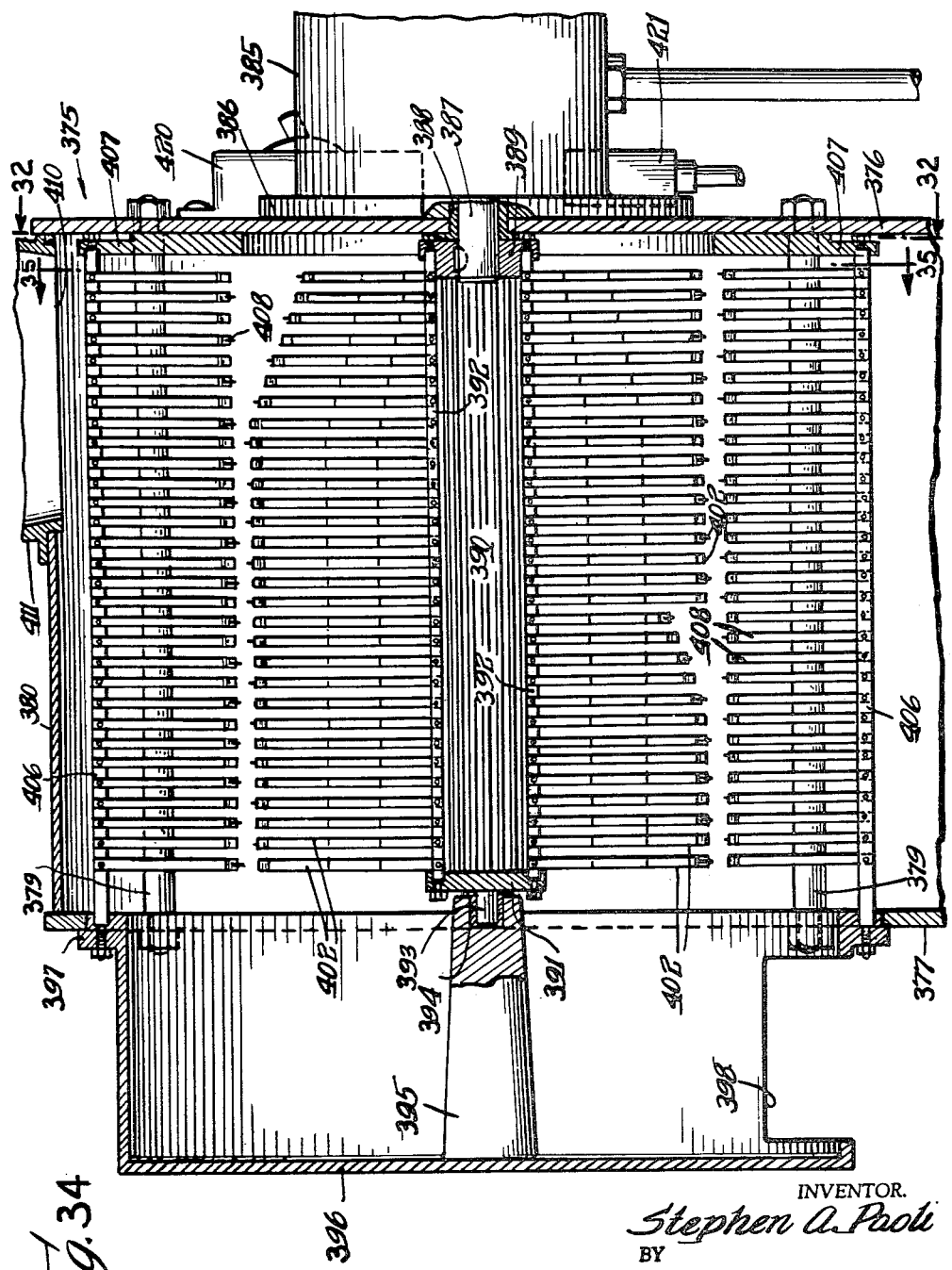

FIG. 32 is a vertical sectional view through the machine of FIG. 31 and taken substantially in the plane of the line 32—32 of FIG. 34.

FIG. 33 is an enlarged partial sectional view taken substantially in the plane of the line 33—33 of FIG. 31.

FIG. 34 is an enlarged fragmentary vertical sectional view taken axially through the machine of FIG. 31 and substantially in the plane of the line 34—34 of FIG. 35.

FIG. 35 is an enlarged fragmentary transverse sectional view through the machine, taken in the plane of the line 35—35 of FIG. 34.

FIG. 36 is a diagrammatic end view of the resilient arms of the rotor of the machine shown in FIG. 31.

FIG. 37 is a diagrammatic side elevational view illustrating the progression pattern of the rotor spring arms.

FIG. 38 illustrates the manner in which the spring arms are secured to the rotor bars.

FIG. 39 is an elevational view of the rotor illustrating the progression pattern thereof.

FIG. 40 is an enlarged fragmentary sectional view illustrating the bone cleaning action of the machine shown in FIG. 31.

FIGS. 41 and 42 are perspective views illustrating the hook fingers and blades carried by the free ends of the spring arms of the rotor and stator in the machine of FIG. 31.

FIG. 43 is an enlarged fragmentary vertical sectional view illustrating one mode of securing the spring arms to the bars of the rotor.

FIG. 44 is a longitudinal sectional view through another form of bone cleaning machine also exemplifying the invention, taken substantially in the plane of the line 44—44 in FIG. 45.

FIG. 45 is a transverse vertical sectional view through the machine of FIG. 44 taken in the plane of the line 45—45.

FIG. 46 is a diagrammatic developmental view similar to FIG. 17 but showing the position and spacing of the cleaning elements on the rotor of the machine of FIG. 44.

FIG. 47 is an enlarged fragmentary perspective view illustrating the projecting end portions of the cleaning elements of the rotor and stator of the machine shown in FIG. 44.

FIG. 48 is an elevational view illustrating still another form of yieldable spring arm for use in the machine of FIG. 31.

FIG. 49 illustrates a further form of bone cleaning machine wherein the supporting means for the cleaning elements are in the form of traveling belts.

FIG. 50 illustrates a further form of bone cleaning machine embodying the invention and wherein the supporting means for the yieldable cleaning elements are in the form of flat circular members.

FIG. 51 shows still another form of bone cleaning machine embodying the invention and wherein the supporting means for the yieldable supporting members are frusto-conical in configuration.

While the invention is susceptible of various modifications, alternative constructions and modes, I have shown in the drawings and will herein describe in detail several illustrative embodiments. It is to be understood, however, that I do not intend to limit the invention by such disclosures, but aim to cover all modifications, alternative constructions, modes and equivalents falling within the spirit and scope of the invention as expressed in the appended claims.

Figure 4:
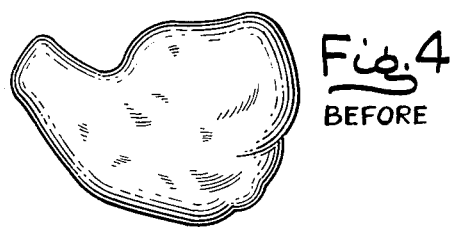
FIGS. 4 and 5 are sequential views of another form of meat and bone product before and after processing in accordance with the present invention.
Figure 2:
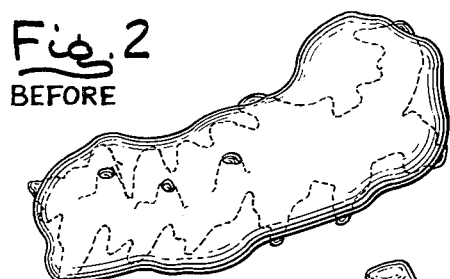
FIGS. 2 and 3 are sequential views of one form of meat and bone product before and after processing in accordance with the present invention.

The method and apparatus of the present invention are applicable to a broad variety of meat-laden bones such as those shown in FIGS. 2 and 4. The expression "meat-laden bone," as used herein, includes manually cleaned bones which still carry residual meat, bones from which the primal cuts of meat have been removed but which have not been manually cleaned, and complete bone-in cuts of meat such as rounds, shanks, necks and shoulders. The two illustrated items are simply exemplary of this broad variety of meat and bone products handled by the invention.

Figure 3:

FIG. 2 shows a non-disjointed beef neck bone from which a portion of the meat has been trimmed manually in accordance with ordinary packing house practice. After processing by application of the method and apparatus of the present invention, the remaining meat is cleaned from the bone and the latter is left in the condition illustrated in FIG. 3. The meat which is removed is in generally comminuted form and includes a high proportion of edible lean meat. It is collected in the course of the cleaning operation and is suitable for sale to consumers or subsequent processing into many different meat foods.

Figure 5:
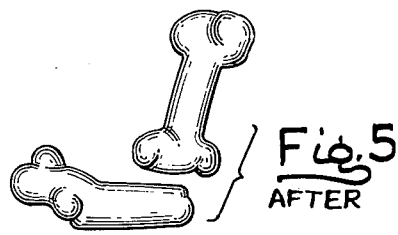

FIG. 4 shows a bone-in cut of pork commonly known as a picnic shoulder. This cut may be processed directly by application of the method and apparatus of the invention without prior manual removal of meat therefrom. In the course of such processing the meat is removed from the bones of the picnic shoulder and collected for subsequent use, the bones being left in the cleaned condition shown in FIG. 5.

Figure 6:
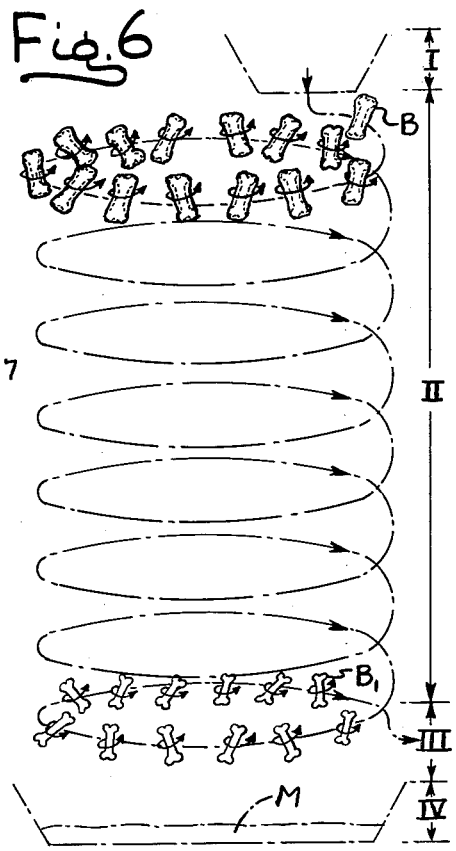
FIG. 6 is a diagrammatic view illustrating one mode of carrying out the method of the present invention.

Referring more specifically to FIG. 6, one illustrative mode of practicing the method of the present invention and applying it to a meat-laden bone B is there shown diagrammatically. The bone B, in this case a manually cleaned bone with residual meat thereon, is passed from a loading zone I into a cleaning zone II where the meat is removed as an incident to its passage therethrough. In the cleaning zone II, meat is cut, scraped, pulled and torn from the bone by relatively movable, yieldable cleaning elements in such manner that it tends to be comminuted into pieces of various size. The cleared bone $B_1$ is then passed to a bone discharge zone III. The removed meat M tends to drop by gravity from the cleaning elements and into a meat collecting zone IV. In actual practice, of course, a procession of such meat-laden bones B in closely spaced relation is handled.

Provision is made in the cleaning zone for subjecting the meat-laden bone B to the relatively movable yieldable cleaning elements in such manner that the product is tumbled with random motion on an individual, shifting axis in or close to the bone. Such axis tends to be generally longitudinal of the bone and the position of the axis at any instant is determined by the least resistance attitude of the bone to the action of the cleaning elements. This serves to expose substantially all of the external surface of the bone, including crevices, bulges and other irregularities, to the action of the cleaning elments. Simultaneously, the bone is moved bodily along a generally predetermined path through the cleaning zone as an incident to exposure to the cleaning elements. Such predetermined path leads through and out of the cleaning zone and it may have a fixed axis spaced from the shifting individual axis of random tumbling movement.

In the present instance, as indicated in FIG. 6, the bone is progressed with bodily movement through the cleaning zone along a predetermined path of substantially helical or spiral shape. The configuration of the path, as well as the random tumbling motion of the bone as it progresses therealong, are both produced by the disposition and arrangement of the cleaning elements. These elements are yieldable in character and are provided with projecting end portions that are adapted to cut, scrape, pull and tear the meat from the bone.

Turning now to the apparatus of the present invention, it will be noted that the same is exemplified in certain bone cleaning machines described herein. In general, each such bone cleaning machine comprises a first set of cleaning elements including a plurality of resilient arms secured in spaced apart relation on a first mounting means, and a second set of cleaning elements including a plurality of resilient arms secured in spaced apart relation on a second mounting means. The resilient arms of the first and second sets project respectively toward, but short of each other, to define a relatively narrow space between the adjacent free ends thereof, which space is adapted, by lateral bending of the arms, to receive therein a succession of bones to be cleaned. A blade is carried by the free end of each resilient arm with the blades of the two sets of arms respectively oriented for movement in opposite directions. The blades of each set are distributed over a substantial area which may lie substantially in a single plane or in some other surface configuration such as a cylinder or cone. Means are provided for relatively moving the mounting means in one of said directions to carry the opposed blades past each other for removing meat from the bones received therebetween, and for effecting the advance of the bones through the machine, as an incident to such relative movement.

Referring more specifically to FIGS. 1 and 7 to 18, one exemplary embodiment of the invention is there shown in the form of a bone cleaning machine 100. The latter comprises generally two sets of cleaning elements 101, 102 projecting toward but short of each other and including laterally yieldable spring arms 103, 104. The elements 101, 102 are mounted to receive a succession of bones B to be cleaned between them and for relative movement past each other to tear, cut, pull or scrape meat from the bone surfaces and also to advance the bones through and out of the cleaning zone defined by the adjacent ends or blades 105 and 106 of the opposed sets of cleaning elements. Such relative movement is achieved in this instance by rotation between the two sets of cleaning elements about a fixed common axis, thus effecting both cleaning action and advance of each bone through the cleaning zone as it is being acted on by the blades of the cleaning elements.

The machine 100 is enclosed within a protective casing 107 which may be constructed in sections and removed for cleaning purposes. Meat and bone products to be processed in the machine may be introduced through an intake chute 108 at the top of the casing 107. Meat removed from the bones by the cleaning elements tends to drop by gravity into a collecting hopper or chute 109 underlying the casing 107. In this instance, the hopper 109 has a central aperture adapted to discharge the collected meat to a suitable conveyor or receptacle (not shown). The bones cleaned in the machine are ejected from an aperture adjacent the lower end of the casing 107 into a discharge housing 110 adapted to divert them onto an underlying conveyor or receptacle.

The machine 100 is power driven by an electric motor 111 and an associated reduction gear unit 112. The motor 111 may conveniently be controlled by means of a start-stop switch 113. A bracket 114 fixed to the top of the motor provides a convenient means for engaging the lifting hook of an overhead crane or chain hoist to facilitate disassembly of the machine.

Although the means employed for effecting the combined cleaning and feeding action may take various forms, the exemplary ones shown herein involve arrangement of the cleaning elements 101, 102 on generally cylindrical mounting means concentric with each other. One such mounting means is held stationary while the other rotates about an axis common to both. In the machine 100, such means include stationary cylindrical mounting means or stator 115, and rotary cylindrical mounting means or rotor 116 concentric therewith (FIGS. 7, 8, 9).

The stator 115 (FIGS. 7 through 10, 13) comprises a genrally cylindrical frame or cage 117 defined by annular end walls 118, 119 connected by a plurality of cleaning element support bars 120. The ends of the bars 120 fit into annular grooves in the end walls 118, 119 and are retained in place as by means of cap screws 121 projecting therethrough into axially extending tapped holes in the bars. The support bars 120 are spaced circumferentially and in this instance are vertically disposed. They carry the set of cleaning elements 101 which project generally radially therefrom toward the center of the stator.

At its upper end, the stator 115 supports the drive motor 111 and reduction gear unit 112, these units being fixed to transverse support members 122 which extend diametrically across the upper end wall 118. At its lower end, the stator 115 is supported on intersecting horizontal crossbars 123 attached to structural member legs 124. The latter may terminate at their lower ends in casters or fixed anchor elements.

The rotor 116 (FIGS. 7 through 10, 15, 16) comprises a central drum 125 rigidly fixed as by welds 126 to a pair of axially spaced end caps 127, 128, respectively. The end caps 127, 128 are each formed with a plurality of circumferentially spaced, radial slots 129, 130, respectively. These slots are disposed in axially aligned pairs, each pair being adapted to receive the ends of one of a plurality of circumferentially spaced cleaning element support bars 133 which carry the set of cleaning elements 102. The latter project generally radially from the rotor 116. The ends of the bars 133 are rounded at their inner corners to facilitate entry into their corresponding slots upon assembly of the rotor. The slots 129, 130 have their outer ends closed by retainer rings 131, 132, respectively, which lock the support bars 133 in place.

To facilitate ready assembly and disassembly of the support bars relative to the rotor end caps, the retainer ring 132 is mounted for circumferential sliding movement on the lower end cap 128. The ring 132 is formed in this instance with a radial slot comparable in width to each of the slots 130 in the end cap 128 (FIGS. 15, 16). With this arrangement, a rotor support bar 133 may be installed by inserting its upper end in the slot 129 of the upper end cap 127, the retainer ring 131 of which is fixed thereon. At or about the same time, the lower retainer ring 132 is rotated to the point where its slot 134 is aligned with the corresponding slot 130 in the lower end cap 128. The lower end of the bar 133 is then slid through the slot 134 and into the slot 130. This process is repeated for each one of the support bars 133. Upon installation of the last bar, the retainer ring 132 is rotated to bring its slot 134 opposite the land between a pair of adjacent slots 130. The ring 132 may then be secured in that position as by means of set screw 135 (FIG. 15). Disassembly may, of course, be accomplished by reversing this procedure.

In the illustrative machine 100, the rotor 116 is journaled for rotation upon a generally vertical axis located centrally of the machine (FIG. 7). The upper end cap 127 is drivingly coupled, as by means of a keyed or splined connection, to output shaft 136 of motor driven reduction gear unit 112. The lower end cap 128 is formed with an integral stub shaft 137 journaled in a combined line and thrust bearing 138 of the antifriction type. The latter is mounted in a stationary hub 139 situated at the intersection of the frame crossbars 123.

Access to the rotor 116, and to the interior of the stator 115, is provided in the illustrative machine by means of a removable section of support bars 120a overlying the bone discharge aperture 140 (FIG. 7, 11, 12). The bars 120a are identical with the bars 120 except for their shorter length and mode of fastening. Each of the bars 120a is secured at its lower end to an arcuate bracket 141 as by means of a cap screw 142. At its opposite end, each bar is fitted into the annular groove of the upper end wall 118 and secured in place as by means of a threaded stud 143 projecting therethrough and a wing nut 144 threaded thereon. The bars 120a and bracket 141 are manipulable as a unit. The ends of the bracket 141 are slotted at 145 and 146 to receive the adjacent full length support bars 120. To facilitate assembly and disassembly, the slot 145 is somewhat deeper than the slot 146 (FIG. 11).

Each of the stator support bars 120, 120a (FIGS. 7 through 11) carries a plurality of the resilient cleaning elements 101 which in this case comprise leaf spring arms 103. The support bars 120, 120a and the leaf spring arms 103 are arranged so that the latter project substantially radially inward toward the rotor, their projecting ends being spaced from the projecting ends of the cleaning elements 102 on the rotor by a predetermined clearance distance. This distance may, for example, be on the order of 1/8 to 1/4 of an inch. The spring arms 103 are arranged in relatively close, longitudinally spaced relation along the support bars 120, 120a and in this case happen to be secured thereto as by means of pairs of rivets 147. In the present instance, the stator includes sixty-four such bars 120, 120a. Fifty-three of these bars each carry seventeen spring arms 103; the two bars 120 which flank the bone discharge aperture 140 each carry sixteen spring arms 103; and the nine short bars 120a over the aperture 140 each carry twelve arms 103. The spring arms, in one specific embodiment, are each made of spring tempered stainless steel 1 7/16 inches in width, 0.025 inch in thickness, and 6 inches in length mounted with a clearance of 1/16 inch between adjacent arms on the same support bar.

The projecting end portion of each stator cleaning element arm 103 (FIGS. 7, 10 and 18) is somewhat tapered, terminating in a reversely bent hook or finger element 148. In the present instance, the element 148 has a throat opening of about 1/4 to 5/16 inch and its free end defines the blade 105 which normally faces away from the rotor. However, in the operation of the machine, the mean-laden bone engages and deflects the stator arm 103, bringing the hook 148 and its blade 105 into engagement with the bone (FIG. 10).

Alternatively, some or all of the stator cleaning element arms may have an open hook or finger element 148a at their projecting ends (FIG. 14). The hooks 148a also terminate in blades 105 and tend to provide somewhat more cutting and scraping action than the reversely bent hooks 148. They also tend to engage the surface of the bone with less spring arm deflection than is required by the hooks 148. The use of the hooks 148a will, of course, be governed largely by the nature of the bones being processed in the machine.

Each of the rotor support bars 133 (FIGS. 7 through 10, 18) carries a plurality of resilient cleaning elements 102 which in this instance comprise leaf spring arms 104. The latter are rigidly fixed to the leading face (relative to the direction of rotation) of their associated bar as by pairs of rivets 149 and project generally radially outward from the drum 125, stopping short of the ends of the stator elements 101 by the predetermined distance referred to above. The ends of the arms 104, except for the first course, define the cleaning element blades 106. The rotor spring arms 104 are mounted in relatively close, longitudinally spaced relation, in this case ten to a support bar and the rotor including 48 bars. These arms, in the specific embodiment last referred to, were made of spring tempered stainless steel 2 3/8 inches in width, 0.050 inch in thickness, approximately 10 inches in length, mounted with a clearance of 1/8 inch between adjacent arms on the same bar.

The spring arms 104 in the first or upper course of rotor cleaning elements are somewhat shorter than the others, being formed with chamfered or tapered ends 150 so as to leave a large clearance area with respect to the stator cleaning elements 101 (FIG. 7). This clearance area is adapted to receive meat-laden bones from the loading chute 108. The tapered ends 150 of the first course of rotor cleaning elements, assisted by the end portions of the second course and by centrifugal force, direct the bones into active engagement with the other rotor and stator cleaning elements.

Provision is made for advantageously increasing the effective length and deflection of the stator and rotor spring arms 103, 104 when subjected to load incident to operation of the machine. This is accomplished by forming each spring arm 103, 104 with an offset intermediate its ends such that the projecting end portion of each spring arm will be situated in trailing relation to its inner end portion with respect to the direction of relative movement between the rotor and stator (FIGS. 7 through 10, 14).

Referring more particularly to FIGS. 7 and 10, it will be noted that each of the stator spring arms 103 is formed with an offset 151 intermediate its ends. The offset 151 defines an obtuse angle with each end portion of the spring arm 103. In like manner, each of the rotor spring arms 104 is formed with an offset 152 intermediate its ends and also defining an obtuse angle with each end portion of the arm 104. As will be evident from FIG. 10, upon deformation of the spring arms 103, 104 rearwardly due to engagement with a bone, the reaction force on each deflecting spring arm will be applied in part as a longitudinal tensile stress and in part as a lateral bending stress. Since a portion of the reaction force is taken up in tension, this tends to reduce the lateral bending stress on the spring arm. This factor, as well as the greater resiliency due to greater overall length in the spring arm, tends to minimize chances of spring breakage or permanent set.

With the cleaning elements 101 and 102 mounted as described above, it will be apparent that a meat-laden bone P delivered into the intake chute 108 will enter the stator and come in contact with the rotating end portions of the first and second courses of the rotor spring arms 104. These direct the bone between the opposed cleaning elements 101, 102 as permitted by bending of the spring supporting arms 103, 104 (see FIG. 10), according to the size and contour of the bone surfaces being cleaned. Thus, as shown in FIG. 10, the rotor cleaning elements 102 advancing in the direction indicated by the arrow will be bent backwardly far enough to accommodate the inner surface of the bone P. This deflection, particularly when two or more successive spring arms 104 are sandwiched together, results in the buildup of sufficient driving force to bend the stator cleaning elements 101 far enough to accommodate the outer surface of the bone P. The driving force of the rotor spring arms 104, and the reaction force of the stator spring arms 103, tend to rotate or tumble the bone. The relative resiliency of the two sets of spring arms 103, 104 is so proportioned that the turning bone will tend to remain roughly centered in the annular clearance space between the stator and rotor cleaning elements 101, 102.

In the course of this action, various ones of the blades 105 and 106 will engage the bone surface at different angles and thereby act in different ways in removing any meat adhering to the bone. Some of the stator blades 105 and their associated hook elements 148 will engage residual meat directly and pull or tear it off the bone in chunks. Others, both stator and rotor blades 105, 106, will at a given instant be in full contact with the bone surface and scrape across the latter to dislodge meat therefrom. Still other blades may be inclined so that only a corner of the blade engages the bone surface, thereby acting to cut or tear meat off the bone.

The action of each blade will vary in numerous other ways according to its angle of contact with the bone surface. Such angle also varies according to the contour of the bone surface along the rotor axis. With the bone disposed between the two annular sets of cleaning elements and engaged by these at a multiplicity of points spaced around as well as along the bone, the turning movement of the rotor against the bone will rotate or tumble the latter on a shifting individual axis in or near the bone and disposed generally longitudinally thereof. In this way, other parts of the bone surface are presented for engagement by the passing blades of both the inner and outer cleaning elements 101 and 102.

As already noted, the blades 105, 106 of the cleaning elements mounted as above described coact effectually during turning of the rotor to engage and clean the entire surfaces of bones which vary widely in size, shape and contour. An important aspect of the present invention is to utilize the same relative movement between the cleaning elements 101 and 102 to advance each bone progressively through the cleaning zone so as to present different areas of its surface to the cleaning elements, and also to remove the bone from engagement with the cleaning elements before any substantial amount of the bone has been scraped or chipped off.

The desired advance of the bone along the axis of the rotor and eventually out through the discharge opening 140 is achieved in the machine 100 by mounting one or both sets of the cleaning elements to act on the bones like a screw thread, thus utilizing the relative movement between the rotor and stator to advance the bone progressively along the rotor axis until it is discharged from between the cleaning elements. In the present instance, the cleaning elements 102 of the rotor and their spring arms 104 are arranged in a threadlike pattern of generally helical or spiral form. This is shown more fully in FIG. 17, which is a diagrammatic developmental view illustrating the free ends of the rotor spring arms 104 at the outer periphery of the rotor.

Referring more specifically to FIG. 17, it will be noted that this helical or spiral pattern is defined by a void or flute 153 approximately 1¼ inches wide and extending approximately 7 turns around the rotor over the course of the rotor length, the latter in this case being about twenty-six inches between end caps. Such helical pattern is obtained in a novel manner by forming the outer ends of the rotor spring arms with relatively wide relief notches, leaving projecting end portions of comparable width which terminate in the blades 106. In addition, the rotor spring arms 104 are arranged with their projecting end portions in a plurality of axially spaced rows, each of which extends only part way around the rotor circumference, and by overlapping adjacent rows in a circumferential direction to obtain the desired pitch of the flute or void 153 between the rows of spring arms. In this instance, the projecting end portions of the rotor arms 104 are arranged in groups of twenty-four in adjacent axially spaced rows, with adjacent sets of projecting end portions being overlapped circumferentially to the extent of four arms so as to obtain a staggered effect. This defines what appears in FIG. 17 to be seven voids 153, each comprising three straight-line portions offset progressively from upper left to lower right, as viewed in FIG. 17. However, in the actual spring arm pattern on the rotor, these voids are really one continuous passage or flute extending around the rotor about seven times in the length of the rotor.

Provision is made so that bones cannot enter so far into the flute or flutes 153 as to jam between the rows of projecting ends of the rotor spring arms 104. This is accomplished by limiting the depth of the flute 153 throughout the periphery of the rotor, including the interchanges or transition areas where the flute changes direction. Flute depth is determined along the major portion of its length by the depth of the relief notches. At the interchanges or transition areas, flute depth is determined in part by the depth of the relief notches and in part by the use of shortened spring arms having no projecting end portions. The latter also serve as rearward support members for preventing overbending of the bone-engaging spring arm or arms ahead of them.

The rotor 116 may also include means to facilitate positive ejection of cleaned bones through the discharge aperture 140 without undue interference with the flow of removed meat from the cleaning elements to the collecting hopper. This may be accomplished by forming the lowermost course of rotor spring arms 104 with integral extensions 154 which underlie the stator spring arms 103 in closely spaced relation therewith (FIG. 7). The extensions 154 may also be twisted on their radial axes, as shown in FIGS. 7 and 9, to increase the surface area which intercepts the falling bones. With this construction, bones reaching the lower end of the annular space between the cleaning elements 101, 102 will be supported and positively guided by the extensions 154, aided by centrifugal force, into the bone discharge aperture 140.

By reason of the helical or spiral progression pattern of the rotor cleaning elements 102 and their spring arms 104, the rotor elements 102 act on the bone in a manner analogous to a screw thread on a mating nut. This advances the bone axially as well as circumferentially of the rotor. The overall movements of a bone are illustrated in FIG. 6 from which it will be apparent that the bone is turned, rolled or tumbled continuously as indicated by the small arrows while being advanced bodily along a generally helical path which is indicated by the long arrows and which progresses both around and along the rotor axis. In a few revolutions around the rotor axis, the bone is carried to the ends of the rotor and stator and discharged from the bone discharge opening 140.

As shown in FIGS. 6 and 10, the bone will usually assume a position with its longer dimension extending generally along the rotor axis. Thus, the bone itself turns, rolls or tumbles with random motion about a shifting axis of its own while it is being advanced bodily around the rotor axis. By these combined actions, all surfaces of the bone are presented to the cleaning elements and each area is engaged many times and in many different ways with the result that the meat on the bone is substantially all removed without at the same time breaking or chipping off objectionable quantities of the bone itself. This is due not only to the comparative bluntness of the blades but also to the more pliable character of the meat coupled with the fact that the blades are mounted to yield when the more rigid surface of the bone is encountered.

It will be apparent that with the elements 101 and 102 mounted as described above, the machine adapts itself automatically to bones of widely varying sizes and shapes while acting with equal efficiency in removing the meat from the bone surfaces. At the same time the relative motion between the elements to remove the meat from the bones is utilized in a novel manner to feed each bone through and out of the cleaning zone. It is only necessary, therefore, to deliver the bones into the chute 108, the cleaning operation then proceeding automatically.

In the present instance, it has been found that excellent results are obtained by operating the rotor at such speed as to impart to the outer ends of the inner cleaning elements 102 a linear speed of approximately 660 to 825 feet per minute.

By cleaning the bones in the manner contemplated, virtually all of the meat that could be removed by careful and laborious hand trimming is recovered. In addition, much of the labor spent according to present practice may be saved, since less hand trimming is required.

The meat removed is largely lean and is readily usable in a wide variety of meat food products. In some instances it may be salable without further grinding as is necessary with the meat removed from bones by hand trimming.

*Modifications*

Referring more specifically to FIGS. 19 through 30 another exemplary embodiment of the invention is there shown in the form of a bone cleaning machine 200 of the cylindrical type. The latter comprises generally two sets of cleaning elements 210, 211 projecting toward each other and mounted on laterally yieldable spring arms 209 to receive a succession of bones B to be cleaned between them and for relative movement past each other so as to not only tear, cut, or scrape meat from the bone surfaces but also to advance the bones through and out of the cleaning zone defined by the adjacent ends or blades 213 and 214 of the opposed sets of cleaning elements. Preferably, the relative movement to effect the cleaning action is achieved by rotation between the two sets of cleaning elements about a fixed common axis and the rotary motion is also utilized to create a force for effecting the advance of the bone through the cleaning area as it is being acted on by the blades of the cleaning elements.

In this instance, the elements 210 and 211 are arranged to form generally cylindrical cleaning surfaces concentric with each other and one mounted stationarily while the other rotates about the common axis. The stator or stationary cylindrical mounting means is a generally cylindrical frame or cage 215 around which the elements 210 are spaced both axially or circumferentially and longitudinally, the cage being apertured for the free passage of finely ground pieces of meat outwardly therethrough. The cage is disposed within a hollow tubular casing 216 having end walls 217, 218 connected by tie bolts 219 (FIG. 20) and supported above the machine base 220. The cleaning elements 211 of the other or inner set are similarly spaced apart and project outwardly from a drum or inner cylindrical supporting means 221 having trunnions 222 at opposite ends journaled in bearings on the housing end walls. In this instance, the cleaned bones are discharged through an opening 223 (FIG. 20) formed by a ring 231 encircling a central opening in the end wall 217. The drum bearing at this end is carried by a crossbar 224 which is preferably U-shaped so that the bearing is spaced outwardly from the housing end wall 217. The other trunnion of the drum is coupled to a shaft 225 driven through a speed reducer from an electric motor 226 mounted on the machine frame.

As shown in FIG. 24, the blades 213 and 214 of the cleaning elements 210 and 211 are relatively short and disposed with their edges facing circumferentially around the rotor axis. Each element takes the form of a finger or hook fixed to the end of a relatively stiff but nevertheless flexible spring arm 209 anchored at its other end so as to be supported cantilever fashion for lateral bending in all directions. The blades are at the ends of hook shaped members or fingers 228 formed on the outer ends of the spring arms 209, which, in this instance and to obtain the desired characteristics, comprise cylindrical helical coils 227 of resilient wire with closely contacting convolutions ⅜ of an inch in diameter and of a substantial length, for example, 1½ to 3 inches. The wire used in the present instance is 1/16 of an inch in diameter. Whereas in the illustrated embodiment of the invention, the flexible arms 209 comprise a helical coil of resilient wire, the flexible arms may be conveniently designated spring arms.

Each spring coil 227 is mounted cantilever fashion at one end and the wire extending beyond the other end is bent laterally of the coil axis to form the hook or finger 228 (FIGS. 8 to 10) which in the case of the rotor elements 11 opens in the direction of turning of the supporting rotor or drum 21 but reversely in the case of the stator elements 10. To this end, the wire is spiraled away from the terminal convolution of the coil into a plane including the coil axis and at the same time is bent upwardly in an arc 238 so as to leave a straight portion or finger 239 at the end. The latter is disposed perpendicular to the coil axis and projects transversely across the latter and outwardly beyond the side of the coil, the length of the finger 239 being about half an inch.

Some of the ends 213 and 214 which form the blades of the cleaning elements 210 and 211, in this instance the alternate elements of each row, are flattened as indicated at 240 (FIGS. 22 and 23) in a plane perpendicular to the coil and terminate in widened but rather blunt end edges 241 of the blades 213 or 214, the length of the latter being several times the diameter of the wire forming the fingers. The blades thus constructed are especially adapted to scrape the bone surfaces without gouging into and removing part of the bone proper. The ends of the other or intervening cleaning elements are flattened in a perpendicular direction as shown in FIG. 23 to produce a similar widening of the blade edge. Since the latter lies in a plane perpendicular to the direction of motion past the bone being cleaned, the corners of the edge may remove the meat by a tearing action and this, without cutting or gouging out any substantial amount of the bone itself.

The ends of the coils 227 opposite the cleaning elements 210 and 211 are anchored in the stator frame or on the rotor drum so as to be disposed substantially radially with the inner and outer cleaning elements disposed close to each other (FIGS. 20, 21, and 24) but spaced apart radially so as to pass by each other during turning of the drum. In the case of the stator elements, the end of the wire the coil is bent at right angles as indicated at 229 (FIG. 24) and projected outwardly with a close fit through a hole in a bar 230 which spans the end walls 217 and 218 of the housing 216 and is clamped at opposite ends in rings 231 which abut against the housing end walls. After passing through the bar until the end of the coil comes into abutment with the bar, the wire is bent laterally and at right angles as indicated at 233 to lie in a slot 234. The projecting end 235 of the wire is again bent substantially at right angles to lie alongside the bar, the spring coil thus being locked against displacement laterally or longitudinally of the bar and held securely against twisting by the side walls of the slot 234.

The stator frame 215 is formed by the end rings 231 and a multiplicity of the bars 230 paralleling each other and the axis of the rotor and closely spaced around the circumference of the stator so as to locate the inner ends of the coils 227 on the adjacent bars about half an inch apart as shown in FIG. 24. The cleaning elements 210 are thus correspondingly spaced apart longitudinally of the stator, this being accomplished by drilling and slotting each bar 230 at regular intervals along its length as shown in FIG. 27 and attaching spring coils in the manner described above. To facilitate advance of the bones through the cleaning zone defined by the elements 210 and 211, the points of anchorage of the stator elements 210 on the adjacent bars 230 are preferably offset slightly from each other as shown in FIG. 27 so as to arrange the elements in a row which progresses helically around the stator with a lead angle c on the order of 10 degrees. This angle is varied according to the desired rate of advance of a bone through the cleaning area and therefore the time during which a bone is subjected to the cleaning action.

The bones B to be cleaner are introduced into the cleaning area defined by the elements 210 and 211 by feeding the same in a radial direction through the stator elements near the end opposite that from which the cleaned bones are to be discharged. For this purpose, one or more of the bars 230 is omitted at the top of the stator as shown in FIG. 21 to provide a radial opening 246 vertically aligned with a chute 245 supported on the top of the housing 216 and projecting through an opening in the latter.

The meat removed from the bones by the action of the relatively rotating stator and rotor elements 210 and 211 is quite finely ground or comminuted, the pieces being comparable in size to ordinary hamburger. The particles are therefore small enough to gravitate downwardly between the coils 227 of the stator elements 210 and outwardly between the bars 230 of the frame. A coarse inclined screen 254 may be disposed below the stator to catch pieces of bone that may be chipped off in the cleaning process. The comminuted meat passing through the screen falls through an opening 255 in the bottom of the housing 216 and accumulates in a receptacle 256.

The coiled springs 227 carrying the rotor cleaning elements 211 are mounted cantilever fashion and project radially and outwardly from the rotor drum 221 while being spaced uniformly around and longitudinally of the latter to space the elements inwardly a short distance from the stator elements 210, in this instance about one-fourth of an inch. While the mounting of the rotor elements may be the same as described above for the stator elements 210, a special mounting is employed in the present instance to facilitate anchoring and spacing of the inner coil ends. This is achieved by bending the extended end 247 of the wire substantially at right angles to the coil 227 and, starting at a point close to the latter, winding a second coil 248 of the same or smaller size as the coil 227 and somewhat shorter than the latter. The second coil 248 is disposed on the side of the first opposite the cleaning element 211 on the latter and extends parallel to the shank 239 of the hook or finger of this element. The second coil 248 surrounds and is threaded onto a heavier wire 249 (FIG. 24) which extends helically around the drum 221 at the relatively small lead angle $d$ (FIG. 20). Eyes 250 at opposite ends of the wire are fastened as by screws to corresponding ends of the drum 221 after enough of the coils 248 have been threaded onto the wire to fill the entire length of the latter and bring the successive coils 248 into end to end abutment as shown in FIG. 24.

The coils 248 thus serve as spacers for determining the angular spacing of the elements 211. To complete the anchorage, the wire 251a at the outer end of the coil 248 is extended tangentially and at right angles to the coil axis along the surface of the supporting drum 21 so as to underlie the next adjacent coil 248 as indicated at 251. The extension bears against the drum surface thus preventing the coil 248 from turning in one direction. In the other direction, turning by unwinding of the coil 248 is prevented by the adjacent coil 248 and the supporting helix 249.

The cantilever mounting thus provided offers greater resistance to bending of each coil 227 and therefore the associated element 211 in one direction, clockwise as viewed in FIG. 29, than in the other direction. That is to say, each coil 248 when anchored at one end as above described resists turning of its other end with a force which is greater when the force is in a direction to wind the coil more tightly than when the bending tends to unwind the coil. As a result, the mounting of each element 211 is somewhat stiffer and offers more resistance to lateral flexure in one longitudinal direction along the rotor than in the reverse direction.

Such differential resistance to sidewise displacement of the rotor elements may be achieved in other ways. For example, the inner ends of the spring coils 227 may be disposed in a groove 260 which extends helically around the rotor drum 221 (FIG. 30). The groove 60 has side walls which after different degrees of flexing of the coil in opposite directions engage the coil at a point spaced a short distance outwardly from the ends. Thus, by its engagement with one of the groove walls, the effective or unsupported length of the spring coil is shortened causing a corresponding increase in the stiffness of the spring. By varying the angles at which the coil is disposed when it encounters the opposite side walls of the groove, the desired differential resistance of the spring to bending may be achieved.

In this instance, each rotor coil 227 is mounted in the manner previously described. That is to say, the extended end of the wire 247 is wound into a coil 248 which is threaded onto the helical supporting wire 249, the latter being laid around the bottom of the groove 260. By omitting the wire extensions 251 above described, the coil 248 is free to turn on the support 249 and is thus pivotally supported.

The desired advance of the bone along the axis of the drum and eventually out through the discharge opening is achieved in the present instance by the mounting of one or both sets of the cleaning elements to act on the bones like a screw thread and thus utilize the turning of the rotor to advance the bone progressively along the drum axis until it is discharged from between the cleaning elements. In the present instance, both sets of cleaning elements contribute to the screw action and accordingly the elements 210 and 211 of each set are arranged in a row extending helically around the stator and rotor respectively. In the case of the stator elements 210, the helical arrangement is achieved by locating the points of anchorage of the coils 227 on the adjacent bars 230 in offset relation according to the lead desired in the helical row in which all of the elements are disposed. With the rotor turning in the direction indicated, the stator elements 210 are preferably disposed in the positions shown in FIG. 27 in order to facilitate advance of the bone in the direction indicated. A similar helical arrangement is achieved in the case of the rotor elements by mounting the latter in spaced relation around the supporting wire 249 which extends helically around the drum 221 from one end to the other.

The differential stiffening of the cleaning elements is achieved in the present instance in the mounting of the rotor elements 211. Either of the methods above described may be employed, the increased resistance of each element to bending being provided in the direction opposite that in which it is desired to advance the bones. That is to say, the mounting of the rotor elements is such that each is more readily yieldable in the desired direction of advance of the bones than in the opposite direction. Thus, with the mountings shown in FIG. 29, the bones are advanced through the cleaning area in the direction indicated by the arrow.

With the cleaning elements 210 and 211 mounted as described above, it will be apparent that a bone B delivered into the hopper 245 will pass down through the opening 246 in the stator and come in contact with the rotating blades 214 of the rotor elements 211. These carry the bone laterally in between the opposed cleaning elements 210 and 211 as permited by bending of the spring supporting arms 209 (see FIG. 25), according to the size and contour of the bone surfaces being cleaned. Thus, as shown in FIG. 25, the elements 211 advancing in the direction indicated by the arrow will be bent backwardly far enough to pass the inner surface of the bone or until the driving force has, by bending of the coils 227 of the rotor elements, built up sufficiently to bend the stator elements out of the way of the advancing bone. In the course of this action, the blade edges 213 and 214 of the different blades will engage the bone surface at different angles and thereby act in different ways in removing any meat adhering to the bone.

The action of each blade will vary in numerous other ways according to its angle of contact with the bone surface which angle also varies according to the sloping of the bone surface along the rotor axis. This is illustrated in FIG. 29 which shows an elongated bone whose varying longitudinal contour may cause a bending of the spring coils 227 transversely of the direction of advance of the rotor elements.

With the bone disposed between the two annular sets of cleaning elements and engaged by these at a multiplicity of points spaced around as well as along the bone, the turning movement applied to the inner side of the bone will rotate the latter on its longitudinal axis. In this way, other parts of the bone surface are presented for engagement by the passing blades of both the inner and outer elements 210 and 211.

The rolling of the bone and its bodily advance about the rotor axis in the manner above described is accompanied by displacement of the cleaning elements 210 and 211 transversely of the path of relative movement between the stator and rotor elements. With the latter mounted to resist bending more in one direction than the other longitudinally, there is a definite tendency for the elements deflected in the direction of greater stiffness to urge the bone in the opposite direction thereby overcoming the weaker spring supporting the oppositely deflected elements. This action is augmented by the progression of the elements of each set helically around the rotor axis. By virtue of such progression, the rotor elements act on the bone in a manner analogous to a screw thread on a mating nut and thus advance the bone along the rotor axis in the directions of progression of the elements and also of their weakness to resist lateral deflection. In a similar way, the helically arranged stator elements 210 operate on the bone in a manner analogous to the thread of a nut and, since the helical progression is in the same direction as that of the rotor elements, the forces tending to shift the bone axially are correspondingly augmented. The overall movement of a bone are illustrated in FIG. 28 from which it will be apparent that the bone is turned continuously as indicated by the small arrows while being advanced bodily along a path which is indicated by the long arrows and which progresses both around and along the rotor axis. In a few revolutions around the axis, the bone is carried beyond the ends of the rotor and stator and discharged from the casing outlet 223.

Referring now to FIGS. 31 through 43, a further form of bone cleaning machine exemplifying the present invention is generally designated at 375. It includes a pair of end plates 376 and 377 carried by a base 378. The end plates 376 and 377 are secured together in spaced apart relation by four tie rods 379. A cover 380 is carried between the end plates 376 and 377 and a screen 381 is arranged adjacent the bottom of the machine above a receptacle 382 carried by the base 378. The removed meat passes through the screen 381 and is collected in the receptacle 382. Any coarse bone fragments which may have been chipped from the bones are collected on the screen 381 and may be readily removed therefrom.

An electric motor 385, secured by a flange 386 to the end plate 376, operates through a suitable gear reducer to rotate a shaft 387. Viewed from the motor 385, the shaft 387 is rotated in a clockwise direction as indicated in FIGS. 32, 35, 36 and 40. The shaft 387 may be journaled for rotation in a bearing 388 carried by the end plate 376. A collar 389 is secured to the shaft 387 and this collar 389 forms a part of a mounting means or rotor 390. The rotor 390 also includes a collar 391 and a plurality of rods or bars 392 secured between and to the collars 389 and 391. The rods 392 are received in recesses in the collars 389 and 391 and are provided with screw threaded extensions which extend through holes in the collars 389 and 391 and are provided with nuts for securing the rods 392 in place with respect to the collars 389 and 391. The collar 391 is provided with an extension 393 which is journaled for rotation in a bearing 394 carried by a post 395. The post 395 is, in turn, carried by a housing member 396 which in turn is provided with an annular flange 397. The bottom of the housing member 396 is provided with a discharge opening 398.

The bars 392 of the mounting means or rotor 390, are in this instance each provided with a plurality of recesses 400 which receive the inner ends of a plurality of spring arms 402 of the cleaning elements. The spring arms 402, which are in the form of leaf springs, are secured in place in the recesses 400 in the rods 392 by means of rivets 403 and washers 304 as shown more clearly in FIG. 43. The leaf spring arms 402 extend substantially radially outwardly from the rotor 390.

Provision is made for increasing the effective length and deflection of the rotor spring arms 402 to minimize the bending stress thereon when deflected rearwardly under load as an incident to operation of the machine. This is accomplished by forming each such spring arm 402 with an offset 399, defined by bends 402a, 402b (FIGS. 35 and 40) intermediate its ends such that the projecting end portion of the spring arm will be situated in trailing relation to the inner end portion with respect to the direction of rotor movement. In the present instance, such offset 399 defines an obtuse angle with each end portion of the spring arm 402. Upon deformation of the spring arm 402 rearwardly due to engagement with a bone, the reaction force on the spring arm will be applied in part as a longitudinal tensile stress and in part as a lateral bending stress. However, since a portion of the reaction is taken up in tension, this tends to reduce the lateral bending stress on the spring arm. This factor, as well as the greater resiliency due to greater overall length in the spring arm, tends to minimize chances of rotor spring breakage.

The housing member 396 and its flange 397 form part of a mounting means or stator which also includes a ring 407 and a plurality of rods or bars 406 extending between and secured at their ends to the flange 397 and ring 407. The bars 406 may be like the rotor bars 392, and they may extend into recesses in the flange 397 and ring 407. The bars 406 may also have screw threaded extensions projecting through holes in flange 397 and ring 407 and which may be provided with nuts for securing the bars 406 in place with respect to the flange 397 and ring 407. The bars 406 of the mounting means or stator are in this instance each provided with a plurality of recesses which receive the outer ends of a plurality of spring arms 408 of the cleaning elements. The spring arms 408, which are in the form of leaf springs, are received in place in the recesses in the bars 406 by means of rivets and washers as illustrated in FIG. 43. The leaf spring arms 408 extend substantially radially inwardly from the mounting means or stator and project toward but short of the outwardly extending leaf spring arms 402 of the mounting means or rotor 390.

One or more of the bars 406 are omitted at the top of the stator to allow insertion of bones downwardly through the stator to the narrow space between the inner and outer spring arms 402 and 408. Bones are so fed into the machine through an opening 410 in the cover 380 and a hopper 411 at one end of the machine, the end adjacent the motor 385. The stator is removably mounted in the machine so that it and its leaf spring arms 408 may be removed for cleaning purposes, and so that the rotor 390 and its spring arms 402 may be exposed to facilitate cleaning thereof. Towards this end, the flange 397 removably seats in a large opening in the end plate 377 and the ring 407 is held and guided by the tie rods 379. The tie rods 379 prevent fouling of the inner and outer spring arms 402 and 408 as the stator is being removed and replaced. The stator may be secured in place in the machine in any desired manner, as by a pair of screws 423 extending through the end plate 376 and threaded into tapped holes in the ring 407, as more clearly illustrated in FIG. 33.

The electric motor 385 may be controlled by a starting switch 420 mounted on the end plate 376. An interlock switch 421 may also be connected in series with the motor 385. This switch 421, which may be of the snap acting type, such as a microswitch, is secured to the end plate 376 and is provided with a plunger 422 which extends through a hole in the end plate 376 and which is engaged by the ring 407, when the stator is secured in place, to close the switch. When the stator is removed, however, the switch 421 is automatically opened to prevent operation of the motor 385. This is a safety feature which prevents injury to persons, as for example during cleaning of the machine.

The free ends of the leaf spring arms 402 and 408 are provided respectively with hooks or fingers 413, 413a having blades 414 formed on the ends thereof. The hooks or fingers 413 on the inner rotor arms 402 face circumferentially laterally in the direction of rotation of the rotor 390 and the hooks or fingers 413a on the outer stator arms 408 face in the opposite direction. As the rotor or inner mounting means 390 is rotated, the majority of the hooks or fingers 413 on the leaf spring arms 402 pass closely by the hooks or fingers 413a on the leaf spring arms 408, the spacing therebetween being in this instance substantially one-fourth of an inch. The adjacent blades 414 on the leaf spring arms 402 as well as on the leaf spring arms 408 may be oriented perpendicularly with respect to each other as indicated at 415 and 416 in FIGS. 41 and 42. The blade edges 415 and 416 in this case are in substantial alignment with the faces of the spring arms 402 and 408 and do not project outwardly therebeyond.

As shown in FIG. 40, the blade edges 415 and 416 on the inner leaf spring arms 402 and on the outer leaf spring arms 408 contact the bones therebetween and operate to cut, pull, scrape and tear the meat from the bones in the manner expressed above in connection with other forms of this invention. The spring arms also operate to advance the bones circumferentially around the machine between the two sets of spring arms and at the same time to rotate the bones about their own axes as they are being so circumferentially advanced. As a result, the bones are continuously presented to different blades on the spring arms and at different positions with respect thereto so that a thorough cleaning of the bones is provided. The removed meat passes downwardly and outwardly between the leaf spring arms 408 and bars 406 and through the screen 381 into the receptacle 382 at the bottom of the machine where it is collected. The spring arms are arranged circumferentially behind each other, so that if one spring arm bends too far it engages the spring arm directly behind it. Thus, the contacting spring arms combine their spring forces to resist further bending thereof and prevent too wide a separation of spring arms where the bones could lodge.

Means are also provided in this form of the invention for automatically advancing the bones longitudinally along the machine from the inlet end to the discharge end of the machine as they are being advanced circumferentially around the machine, and these means are more clearly illustrated in FIGS. 32 and 35 and the diagrammatic illustrations of FIGS. 36 to 39. By way of example, the outer mounting means or stator has fifty-three bars 406, each of which carries thirty leaf spring arms 408, the leaf spring arms 408 being arranged in longitudinal rows and in circumferential rows. The inner mounting means or rotor 390 has thirty bars 392, each of which carries thirty leaf spring arms 402. The leaf spring arms 402 are arranged longitudinally in rows and, in addition, they are also arranged circumferentially in a continuous helical row. The leaf spring arms 402, for example, may be longitudinally spaced apart in each longitudinal row by one inch, but adjacent rows are offset with respect to each other by one-thirtieth of an inch. As a result, the leaf spring arms are circumferentially helically arranged with a one inch lead. This helical arrangement of the inner leaf spring arms 402 operates in a manner analogous to a screw thread to assist in advancing bones longitudinally of the machine. Such arrangement of the inner leaf spring arms is illustrated more clearly in FIGS. 37, 38 and 39. If desired, the outer leaf spring arms 408 of the stator could also be helically arranged after the manner shown in FIGS. 37–39 to assist in this longitudinal advancing action.

The leaf spring arms 402 of the rotor 390 are also provided in this case with a helical progression pattern of larger lead angle to assist in longitudinally advancing the bones through the machine, this being shown more clearly in FIGS. 36, 37 and 39. In this respect, substantially two-thirds of the leaf spring arms 402 in each helical convolution thereof are of maximum length while approximately one-third of them are of progressively shorter length, the differences in the graduated lengths being about one-quarter inch. For example, each helical row of leaf spring arms 402 may include twenty-two long arms and eight graduated shorter arms. The long arm A of each helical row may start one bar back from the long arm A of the next adjacent helical row to establish a helical progression pattern as indicated by the line D in FIGS. 37 and 39. The long arm A of each helical row is preceded by a short arm B, the next preceding short arms progressively becoming longer until long arm C is reached. There is thus provided in the external cylindrical contour of the inner set of leaf spring arms 402 a helical progression pattern in the nature of a helical groove bounded by the lines A, B and C as shown in FIG. 37. In the particular embodiment here disclosed for purposes of illustration, there is one complete helical turn of the progression pattern along the cylindrical set of inner leaf spring arms 402. Other progression patterns may be provided, if desired. For example, the long arm A of each helical row may start two bars back from the next adjacent helical row, in which event, two complete helical turns of the progression pattern would be provided. The contour of the helical progression pattern may also be altered by changing the lengths and positions of the shorter leaf spring arms.

As the set of leaf spring arms 402 are rotated for cleaning and circumferentially advancing the bones through the machine, the bones are engaged by the long spring arms A at the edge of the progression pattern which operate to kick the bones longitudinally of the machine toward the discharge end. Thus the progression pattern operates in the nature of a screw for longitudinally advancing the bones through the machine as they are circumferentially advanced and cleaned to discharge the cleaned bones into the housing member 396 and out through the discharge opening 398 in the bottom thereof. The rate of longitudinal advance of the bones through the machine is dependent upon the nature of the progression pattern, and the rate of advance can be predetermined by the proper selection of the progression pattern. The particular progression pattern here disclosed produces good results.

The leaf spring arms 402 and 408 may be formed from high grade spring steel and it has been found that spring steel stock approximately 0.040 inch thick and ¼ of an inch wide is suitable. The widths of the inner and outer leaf spring arms 402 and 408 may be the same. The inner and outer leaf spring arms 402 and 408 may be of the same length but it has been found that good results are also obtained if the inner leaf spring arms 402 are made longer than the outer leaf spring arms 408. Particularly good results have been obtained by using inner leaf spring arms 402 having a length of approximately eight inches and outer leaf spring arms 408 having a length of approximately five inches. The tensions of the leaf spring arms 402 and 408 are so respectively selected, after the effects of centrifugal force have been considered, so as to maintain the bones substantially uniformly between the inner and outer leaf spring arms. If the bones tend to enter farther into the outer leaf spring arms 408 than into the inner leaf spring arms 402, then there is a possibility that they may lodge therein and destroy the cleaning action. Vice versa, if the bones tend to enter farther into the inner leaf spring arms 402 than into the outer leaf spring arms 408, then there is a possibility that they may lodge therein and also destroy the cleaning action. For proper cleaning, it is imperative to keep the bones active at all times between the inner and outer sets of leaf spring arms and this is effectively accomplished by the particular construction herein disclosed.

The outer leaf spring arms 408 may be situated uniformly around the machine, but in some instances they may be arranged more concentrated at the bottom of the machine than at the top, as illustrated more clearly in FIG. 35. Here, the stator bars 406 are located closer together at the bottom than at the top. This provides a more concentrated bed of outer spring arms 408 at the bottom of the machine to compensate for the effects of gravity on the bones and to prevent the bones from becoming lodged in the outer leaf spring arms 408 at the bottom of the machine. Where the outer leaf spring arms 408 are less concentrated, the bones may penetrate further into them resulting in a deeper cleaning action. The bars 406 at the bottom of the machine are spaced apart sufficiently, however, to allow free passage of the removed meat therebetween.

The size or "bite" of the hooks or fingers 413 on the leaf spring arms is also of considerable importance for effective cutting, scraping and tearing of meat from the bones. By "bite" is meant the distance across the opening of the hook. If the "bite" is made too large, the blades 414 tend to dig too deeply into the meat and/or the bone with the result that the bone tends to get caught on the blade or that there is a tendency to chip bone fragments from the bone. If the bone gets caught on the blade, it is prevented from rotating and advancing through the machine so that proper cleaning thereof does not occur. The size of the "bite" or opening of the hooks also affects the coarseness of the meat removed. By selecting the "bite" of the hooks 413 in relation to the kind and type of bones to be processed, unduly deep penetration of the blades 414 into the meat or bone is prevented and the foregoing problems are largely avoided. This also operates to produce a more uniform meat product. It has been found that good results are obtained where the "bite" of the hooks on the outer arms 408 is made about one-fourth of an inch while the "bite" on the hooks on the inner arms 402 is made less than that, even down to five thirty-seconds of an inch.

As expressed above, in the machine 375 the radial spacing between the blades 414 of the inner and outer spring arms 402 and 408 is on the order of one-fourth of an inch. If the spacing is made appreciably less than that, there is danger of the blades catching upon each other which would result in damage to the machine. If the spacing is made appreciably wider, there is a tendency for the bones being cleaned to be hooked onto the blades of the inner leaf spring arms so as to prevent proper advancing of the bones through the machine.

The speed of rotation of the rotor 390 and its leaf spring arms is also an important factor in the operation of the machine of this invention. If the speed of rotation is too high, there is a tendency to stop the constant turning of the bones on the tips of the inner and outer blades, therefore providing a dragging instead of a rolling action. This causes severe bone damage and inadequate meat removal. It is found that excellent results are obtained with the instant machine by turning the rotor at such a speed as to provide the outer ends of the inner leaf spring arms with a linear speed of approximately 825 feet per minute.

The length and diameter of the machine are determined by the desired production capacity and by the size and type of bones to be handled. The length of the machine is correlated with the progression pattern and the rate of advance of the bones through the machine to provide for the proper cleaning of the bones. The diameter of the machine is determined by the length of the leaf spring arms which in turn is determined by the size of the bones to be cleaned. It has also been found that by making the outer leaf springs shorter than the inner leaf springs, larger sized bones can be effectively cleaned without correspondingly increasing the total length of the leaf spring arms. By regulating the spacing between the outer leaf spring arms, together with their resiliency, the penetration of the outer leaf spring arms by the bones being cleaned may be regulated. This also has an effect upon the size of the bones that can be handled and upon the coarseness or size of the meat particles removed from the bone.

It is thus seen that the various parameters of the machine including length of the machine, diameter of the machine, total length of the leaf spring arms, relative lengths of the leaf spring arms, progression pattern, strength of the leaf spring arms, concentration of the leaf spring arms, size and shape of the hooks on the leaf spring arms and speed of rotation, all structurally and functionally cooperate with each other for producing an effective bone cleaning operation and that variations in these parameters permit the machine to be tailored for a wide variety of bone cleaning applications.

Turning next to FIGS. 44 to 47, inclusive, there is shown still another form of bone cleaning machine 570 also exemplifying the present invention. The machine 570 is broadly similar to the machine 375 of FIGS. 31 to 43, inclusive, having a number of parts in common therewith and which will be designated by like reference numerals below. Parts not common to the two machines will be designated by additional reference numerals.

The machine 570 comprises a pair of end plates 571, 572 (FIG. 44), in this instance of upright rectangular form and secured in spaced apart, parallel relation by the tie rods 379. The end plates 571, 572 are surmounted by a generally flat sheet metal cover 574 having overhanging edge flanges, one opposed pair of which are reversely bent so as to support a corresponding pair of side closure panels 575, 576. Housed within the machine 570 and driven by shaft 387 of motor 385 is a mounting means or rotor 578 carrying one set of resilient cleaning elements 579. Another mounting means or stator 580, carrying a set of resilient cleaning elements 581, is removably secured between the end plates 571, 572 and disposed concentrically with the rotor 578. As an incident to relative movement between the cleaning elements 579, 581 of the rotor and stator due to turning of the rotor, bones fed to the machine via the hopper 411 and the opening 410 are simultaneously cleaned and progressed through the machine. The bones are subjected to a tumbling movement in a generally spiral path extending leftward, as viewed in FIG. 44, and are finally discharged, after cleaning, via the opening 398 in the end housing 396. Comminuted meat removed from the bones simply drops down through openings in the stator and is collected by suitable means (not shown) underlying the machine.

The rotor 578 is somewhat similar in construction to the rotor 390 described earlier herein and comprises a pair of axially spaced collars or end caps 582, 584 secured in axial alignment by a plurality of circumferentially spaced rods or bars 585. The latter, which in this instance happens to be of rectangular cross section, have their ends fitted into circumferentially spaced recesses on the inner faces of the end caps and are anchored in place by means of threaded extensions which project through holes in the end caps to receive retainer nuts 588. The end cap 582 fits over the projecting end of motor drive shaft 387 and may be keyed or otherwise drivingly secured thereto for rotation in a clockwise direction as viewed in FIG. 45. A spacer, which may be an extension of bearing 388 surrounding the motor shaft 387, positions the end cap with suitable clearance with respect to the end plate 571 and the end cap to permit free rotation of the rotor. The end cap 584 is provided with an extension or boss 589 journaled for rotation in bearing 394 carried by central post 395 on housing 396. The end cap 584 may also be formed with relatively large arcuate cleaning apertures 590 providing access to the interior of the rotor for cleaning purposes.

Each of the rotor bars 585 is adapted to support a plurality of resilient cleaning elements 579 in longitudinally spaced relation therealong. In this case, the elements 579 are in the form of relatively heavy leaf spring arms and, depending upon their position in the rotor pattern, may be formed in single, double or even multiple units. The elements 579 are secured to their respective bars as by means of rivets 591, in this case four per double unit and two per single unit. The bars 585 are positioned in the rotor so that the spring arms 579 project generally radially therefrom. In the present instance, the rotor 578 includes a total of 50 support bars 585, each having sufficient longitudinal space to accommodate up to 21 single spring arms 579.

For the purpose of increasing the effective length and deflection of the rotor spring arms 579 and minimizing the bending stress thereon when deflected rearwardly under load, each spring arm is formed with an offset 594 intermediate its ends such that the projecting end of the arm 579 will be situated in trailing relation to its inner end with respect to the direction of rotor movement. In the present instance, the offset 594 is defined by bends 594a, 594b and makes an obtuse angle with each end portion of the spring arm. Upon deformation of the spring arm 579 rearwardly during operation due to engagement with a bone, lateral bending stress on the spring arm is reduced and this factor, as well as greater resiliency due to greater overall length in the spring arm, tends to minimize chances of rotor spring breakage or permanent set.

The stator 580 is generally similar to the stator of the machine 375 described earlier herein and is mounted concentrically of the rotor 578 (FIGS. 44 and 45). In the present instance, the stator comprises the housing 396 and its flange 397, the latter centered in a large corresponding opening in the end plate 572, and an axially spaced aligned ring 407 situated against the inner face of the end plate 571 and centered by means of the tie rods 379. In this instance, the flange 397 and ring 407 are rigidly connected by means of a plurality of circumferentially spaced support bars 595 fitted into appropriate recesses therein. The support bars are provided with threaded extensions 196 projecting through the flange 397 and ring 407 and capped by retainer nuts 598 which tend to maintain the stator parts in rigid assembled relation.

Each of the stator support bars 595 carries a plurality of the resilient cleaning elements 581 which in this case are fashioned as leaf spring arms. The support bars 595 and the spring arms 581 are arranged so that the latter project substantially radially inward toward the rotor, terminating in fingers or hooks spaced from the projecting ends of the cleaning elements 579 on the rotor by a predetermined clearance distance. The spring arms 581 are arranged in relatively close, longitudinally spaced relation along the support bars 595 and in this case happen to be secured thereto as by means of pairs of rivets 599. In the present instance, each of the support bars carries forty-nine spring arms 581 and the stator includes fifty-three such bars. One or more of the support bars 595 may be omitted at the top of the stator to permit insertion of bones through the hopper and loading opening 410, 411.

The assembled stator 580, including the housing 396, may be readily removed for cleaning purposes as in the case of the machine 375, it being only necessary to unbolt the flange 397 and slide the stator axially to the left as viewed in FIG. 44. The rotor, being fixed to the shaft 387 is supported by the latter and its bearing 388 and simply remains in place while the stator moves telescopically out of registry therewith.

As indicated earlier herein, the adjacent free ends of the cleaning elements 579, 581 of the rotor and stator are provided with hooks or fingers 600, 601, terminating, respectively, in blades 600a, 601a (FIG. 47). In the instant case, the rotor spring arms 579 are made of wide, heavy gauge material and their hooks 600 are not open very wide. This facilitates engagement with the bones for tumbling the same with minimum roughness, although tending at the same time to reduce somewhat the amount of product removal done by the arms 579. On the other hand, the spring arms 581 of the stator are made of relatively narrower and lighter gauge material, are spaced relatively closely together, and their hooks 601 are wide open, providing substantially closer and gentler following of bone contours than the elements 579 and considerably more cutting, tearing and scraping action on the meat carried by the bones being cleaned. Such an arrangement, shown in FIGS. 45 and 47, has been found to produce excellent results on cleaning pork and beef neck bones, pork "H" bones, and other bones of comparable size. For example, in one specific form of the machine 570 embodying such arrangement, the rotor spring arms 579 are approximately 1⅛ inches in width, 0.062 inch in thickness, and approximately 10 inches in length, with the hook portion 600 reversely bent to an opening of about ⅛ of an inch. The companion stator spring arms 581 are ½ inch in width, 0.035 inch in thickness, and approximately 6 inches in length, with the hook portion 601 being upturned for a distance of approximately 5/16 of an inch. Adjacent stator spring arms are spaced about 1/16 of an inch apart along their support bars. Both sets of spring arms are of stainless steel.

For the purpose of advancing the bones longitudinally of the machine from the inlet to the discharge end and tumbling them in a generally helical or spiral path therein, the spring arms 579 of the rotor are arranged in substantially a helical or threadlike pattern. In the present instance, this pattern is defined by a void or flute 602 approximately 1½ inches wide and extending approximately 6½ turns around the rotor over the course of the rotor length, the latter in this case being about twenty-eight inches between end caps. The rotor spring arms 579 are arranged in a plurality of axially spaced rows, each of which extends only part way around the rotor circumference, and adjacent rows are overlapped in a circumferential direction to obtain the desired pitch of the flute or void 602 between the rows of spring arms. Upon reference to FIG. 46, which is a diagrammatic developmental view illustrating the position of the free ends of the rotor spring arms 579 at the outer periphery of the rotor, it will be noted that the rotor arms are arranged in groups of thirty in adjacent axially spaced rows, with adjacent sets of arms being overlapped circumferentially to the extent of twelve to thirteen arms so as to obtain a staggered effect. This defines what appears in FIG. 46 to be six voids 602, each comprising three straight-line portions offset progressively from lower right to upper left, as viewed in FIG. 46. In the actual spring arm pattern on the rotor, however, these voids are really one continuous passage or flute extending around the rotor about six and one-half times in the length of the rotor.

For the purpose of providing rearward support for the last spring arm in each group and thus precluding overbending of the same, the rotor may be provided with one or more shortened spring arms 604, which may be approximately three-fourths the length of the arms 579 but carry no hooks at their outer ends. Each trailing spring arm in a group (trailing with respect to the direction of rotor rotation) is followed by such a shortened spring arm, as shown in FIGS. 45 and 46.

In certain applications where bones of relatively small size are being processed in the machine, it may be desirable to make provision so that such bones do not drop too far into the flute or flutes 602 and jam between the rows of rotor spring arms 579. This may readily be avoided by utilizing a plurality of shortened springs, such as the spring 604, locating them along the flute 602 in every space where a full-sized spring has been omitted.

In FIG. 48, there is illustrated another form of spring arm for the yieldable cleaning elements 210 and 211 of the machine 200 described earlier herein. This particular spring arm is made from flat spring steel stock and being formed into an undulating configuration as designated at 638. This provides for considerable flexibility in a relatively short spring. The outer spring arm may be formed over the stator bar 639 and held in place by a screw 640. The inner spring arm may be similarly attached to the rotor.

FIG. 49 illustrates another form of bone cleaning machine 700 also embodying the invention and wherein the two sets of cleaning elements 710 and 711 and their spring arms 709 are carried, respectively, by a pair of continuous belts or conveyors 712 and 713. Bones to be cleaned are supplied to the cleaning elements 711 on the belt or conveyor 713 from a hopper 714. The conveyor or belt 713 is operated in the direction indicated at a fast speed, for example 25 r.p.m. The other conveyor or belt is operated in the same direction, as indicated, at a slow speed, for example 1 r.p.m. Thus, the cleaning elements 711 are rapidly moved relative to the cleaning elements 710, the cleaning elements 710 and 711 facing, respectively, in opposite directions. The conveyor 713 carries the bones to be cleaned between the cleaning elements 710 and 711, which, in the manner discussed above, cut, scrape and tear the meat from the bones because of the relative movement between the cleaning elements 710 and 711. This relative movement also causes the bones to rotate about their own axes to continually present new surfaces to the cleaning elements 710 and 711 to be cleaned thereby. Since the conveyor or belt 712 also moves forwardly, but at a slow speed, advancement of the bones longitudinally through the machine is assured. The meat removed from the bones is deposited on a belt conveyor 715 to be conveyed away in the direction indicated. The cleaned bones are deposited on a roll conveyor 716 to be conveyed away in the direction indicated. Any removed meat falling on the rolls 716 passes between the rolls onto the conveyor 715.

A further form of the bone cleaning machine 800 examplifying the invention is illustrated in FIG. 50, it being of the flat circular type. Here, one set of cleaning elements 810 is carried by spring arms 809 secured to a stationary plate 812 supported by brackets 813. The other set of cleaning elements 811 is carried by spring arms 809 secured to a cage 814 which in turn is carried eccentrically by a rotating shaft 815. The cleaning elements 810 and 811 happen in this instance to be arranged in concentric circular rows on the plate 812 and cage 814, and the cleaning elements face in appropriate opposite directions. Bones to be cleaned are centrally inserted from a hopper 816 between the cleaning elements 810 and 811, to be cleaned thereby in the manner expressed above in connection with the other forms of this invention. It will be noted that cage 814 is eccentrically mounted on the shaft 815, so that as the cage is rotated the concentric rows of cleaning elements 811 thereon are gyrated as well as centrifugal force acting on the bones operates to feed the bones outwardly for depositing the cleaned bones into an outer annular receptacle 817. The removed meat passes through the cage 814 into an inner receptacle 818. One or both sets of cleaning elements 810 and 811 may be provided with a progression pattern, in the nature of a spiral groove, for further aiding in the outward advance of the bones as they are being cleaned.

The bone cleaning machine of this invention may also take the form of the machine 900 illustrated in FIG. 51 which is of the frusto-conical type. Here, one set of cleaning elements 910 is carried by spring arms 909 which in turn are secured to a stationary frusto-conical cage 912. The other set of cleaning elements 911 is carried by spring arms 909 which in turn are secured to a frusto-conical cage 913 which is supported by a ring 914 fixed on a shaft 915. The shaft 915 is adapted to rotate the inner cage 913 for rotating the cleaning elements 911 with respect to the adjacent cleaning elements 910. The cleaning elements 910 and 911 face appropriately in opposite directions so that bones inserted therebetween centrally of the machine are cleaned thereby in the manner generally described above in connection with the other forms of the invention. The bones, as they are being cleaned, advance downwardly and outwardly under the influence of gravity and centrifugal force and the cleaned bones are discharged into the outer annular receptacle 916. The removed meat passes downwardly through the inner cage 913 into the central receptacle 917 where it is collected. The cleaning elements 910 and/or 911 may also be provided with a progression pattern in the form of spiral grooves or the like for aiding in advancing the bones downwardly and outwardly as they are being cleaned.

While the various forms of the invention illustrated in FIGS. 49, 50 and 51 are shown utilizing spring arms of helically coiled wire, they may, for example, utilize leaf spring type arms such as the spring arms 402 and 408 utilized in the form of the invention illustrated in FIGS. 31 to 43.

I claim as my invention:

1. A machine for removing meat from bone and comprising, in combination, a first mounting means, a first set of yieldable cleaning elements secured to said first mounting means, a second mounting means, a second set of yieldable cleaning elements secured to said second mounting means, the cleaning elements of said first and second sets projecting respectively toward one another in opposed relation with their projecting end portions closely adjacent but short of each other, said projecting end portions defining a relatively narrow space therebetween which space is adapted by deflection of said cleaning elements to receive a succession of bones to be cleaned, a blade carried by said projecting end portion of each said cleaning element, and means for relelatively moving said first and second mounting means with respect to each other to carry the blades of each opposed set past those of the other in opposite tangential directions for removing meat from the bones received therebetween.

2. A machine for removing meat from bone and comprising, in combination, a first mounting means, a first set of spring arms secured to said first mounting means, a second mounting means, a second set of spring arms secured to said second mounting means, the arms of said first and second sets projecting respectively toward one another in opposed relation with their projecting end portions closely adjacent but short of each other, said projecting end portions defining a relatively narrow space therebetween which space is adapted by lateral bending of said spring arms to receive a succession of bones to be cleaned, a blade carried by said projecting end portions of each said spring arm, and means for effecting relative movement between said first and second mounting means to carry the blades of each opposed set past the blades of the other in opposite tangential directions for removing meat from the bones received therebetween.

3. A machine for removing meat from bone as defined in claim 1 and wherein certain ones of said yieldable cleaning elements each have a finger at the projecting end portion, each said finger having a free end terminating in one of said blades.

4. A machine for removing meat from bone and comprising, in combination, a first mounting means, a first set of yieldable cleaning elements secured to said first mounting means, a second mounting means, a second set of yieldable cleaning elements secured to said second mounting means, the cleaning elements of said first and second sets projecting respectively toward one another in opposed relation with their projecting end portions closely adjacent but short of each other, said projecting end portions defining a relatively narrow space therebetween which space is adapted by deflection of said cleaning elements to receive a succession of bones to be cleaned, a blade carried by said projecting end portions of each said cleaning element, said projecting end portions of said cleaning elements in at least one set being disposed in a generally spiral pattern defining an orbital path for the bones being cleaned, and means for relatively moving said mounting means with respect to each other to carry the blades of each set past those of the other in opposite tangential directions for removing meat from the bones received therebetween and for progresisng the bones past said cleaning elements as an incident to said relative motion.

5. A machine for removing meat from bone and comprising, in combination, a hollow cage apertured for the passage of meat particles therethrough, an inner carrier mounted coaxially with and disposed within said cage, means for effecting relative movement between said cage and said inner carrier, a set of spring arms anchored at one end in said cage and projecting inwardly at closely spaced points distributed over the interior of the cage both longitudinally and circumferentially thereof, and a set of spring arms similarly spaced apart around and along said carrier and projecting outwardly from the latter and opposed to said first-mentioned set of spring arms, each of said spring arms having at its projecting end a blade terminating in a combined cutting, tearing and scraping edge disposed adjacent but short of the edges of the corresponding opposed sets of spring arms.

6. A machine for removing meat from bone and having, in combination, an outer carrier stationarily mounted and apertured for the passage of meat particles therethrough, an inner carrier disposed within and mounted to turn about the axis of said outer carrier, a plurality of spring arms anchored at one end in said outer carrier and projecting inwardly at closely spaced points distributed over the interior of the carrier both longitudinally and circumferentially thereof, and a plurality of spring arms similarly spaced apart around and along said inner carrier and projecting outwardly from the latter in opposed relation with those of said outer carrier, each of said spring arms having a free end carrying a blade terminating in a combined cutting, tearing and scraping edge disposed adjacent but short of a common clearance space and the blades of the inner and outer pluralities of spring arms being disposed respectively for engagement in different directions.

7. A machine for removing meat from bone and comprising, in combination, an outer carrier stationarily mounted and apertured for the passage of meat particles therethrough, an inner carrier disposed within and mounted to turn about the axis of said outer carrier, a first set of spring arms anchored at one end in said outer carrier and projecting inwardly at closely spaced points distributed over the interior of the carrier both longitudinally and circumferentially thereof, and a second set of spring arms spaced apart around and along said inner carrier and projecting outwardly from the latter in opposed relation with those of said outer carrier, a plurality of the spring arms of at least one said set having projecting end portions offset laterally in a generally helical pattern, each of said spring arms having at its free end a blade terminating in a combined cutting, tearing and scraping edge disposed adjacent but short of a common clearance space and the blades of said first and second sets of spring arms being disposed respectively for engagement in different directions.

8. A bone cleaning machine having, in combination, a first mounting means, a first set of elongated spring arms secured at one end in spaced apart relation on the first mounting means, a second mounting means, a second set of elongated spring arms secured at one end in spaced apart relation on the second mounting means, the elongated spring arms of the first and second sets projecting respectively toward but short of each other in opposed relation to define a relatively narrow space between the adjacent free ends thereof which space is adapted by lateral bending of the elongated spring arms to receive therein a succession of bones to be cleaned, a blade carried by the free end of each elongated spring arm with the blades of the two sets of spring arms disposed respectively for engagement in different directions, and means for relatively moving the mounting means with respect to each other to carry the opposed blades of each said set past those of the other in opposite directions for removing meat from the bones received therebetween, a plurality of the elongated spring arms of one of the sets of spring arms being shortened to define a laterally offset progression pattern at the free ends of the spring arms thereof for advancing the bones along the narrow space between the two sets of spring arms.

9. A bone cleaning machine having, in combination, a first mounting means of generally annular form, a first set of elongated spring arms secured at one end in spaced apart relation to the first mounting means and extending inwardly therefrom, a second mounting means concentric with the first mounting means, a second set of elongated spring arms secured at one end in spaced apart relation to the second mounting means and extending outwardly therefrom, the elongated spring arms of the first and second sets projecting respectively toward but short of each other in opposed relation to define a relatively narrow annular space between the adjacent free ends thereof which space is adapted by lateral bending of the elongated spring arms to receive therein a succession of bones to be cleaned, a blade carried by the free end of each elongated spring arm with the blades of the two sets of spring arms disposed respectively for engagement in different directions, and means for relatively rotating said first and second mounting means with respect to each other to carry the opposed blades past each other in opposite tangential directions for removing meat from the bones received therebetween, a plurality of the elongated spring arms of one of said sets being shortened to form a helical progression pattern at the free ends of the spring arms thereof for advancing the bones longitudinally along the narrow annular space between the two sets of spring arms.

10. A machine for removing meat from bone and having, in combination, a first mounting means, a first set of elongated leaf spring arms secured at one end in spaced apart relation on the first mounting means, a second mounting means, a second set of elongated leaf spring arms secured at one end in spaced apart relation on the second mounting means, the elongated spring arms of the first and second sets projecting respectively toward one another in opposed relation with their projecting end portions closely adjacent but short of each other, said projecting end portions defining a relatively narrow space therebetween adapted by lateral bending of the elongated spring arms to receive therein a succession of bones to be cleaned, a plurality of blades carried by the free ends of said elongated spring arms in each said set, and means for relatively moving the first and second mounting means with respect to each other to carry said blades of each opposed set past those of the other in opposite tangential directions for removing meat from the bones received therebetween.

11. A machine for removing meat from bone as defined in claim 10 and wherein certain ones of said leaf spring arms, each having a finger at the projecting end portion, each said finger having a free end terminating in one of said blades.

12. A machine for removing meat from bone and comprising, in combination, a hollow cage, an inner carrier mounted coaxially with and disposed within said cage, means for effecting relative movement between said cage and said inner carrier, a set of outer leaf spring arms anchored at one end in said cage and projecting inwardly at closely spaced points distributed over the interior of the cage both longitudinally and circumferentially thereof, and a set of inner leaf spring arms spaced apart around and along said carrier and projecting outwardly from the latter, each of said leaf spring arms having at its projecting end a blade terminating in a combined cutting, tearing and scraping edge disposed adjacent but short of the edges of the inner and outer sets of spring arms.

13. A machine for removing meat from bone and comprising the combination of an outer carrier stationarily mounted and apertured for the passage of meat particles therethrough, an inner carrier disposed within and mounted to turn about the axis of said outer carrier, a first plurality of leaf spring arms anchored at one end in said outer carrier and projecting inwardly at closely spaced points distributed over the interior of the carrier both longitudinally and circumferentially thereof, and a second plurality of leaf spring arms spaced around and along said inner carrier and projecting outwardly from the latter, the leaf spring arms of at least one of said plurality being progressively offset laterally with respect to each other, each of said arms having at its free end a blade terminating in a combined cutting, tearing and scraping edge disposed adjacent but short of a common cylinder of revolution and the blades of the inner and outer sets of leaf spring arms facing in different directions.

14. A machine for removing meat from bone and comprising, in combination, a first mounting means, a first set of leaf spring arms secured to said first mounting means, a second mounting means, a second set of leaf spring arms secured to said second mounting means, the leaf spring arms of said first and second sets projecting respectively toward one another in opposed relation with their projecting end portions closely adjacent but short of each other, said projecting end portions defining a relatively narrow space therebetween adapted by deflection of said leaf spring arms to receive a succession of bones to be cleaned, the leaf spring arms of one said set being formed with lateral offsets intermediate their ends, said offsets shifting said projecting end portions of said one set of leaf spring arms toward the general direction of their deflection, a blade carried by said projecting end portion of each of said leaf spring arms, and means for relatively moving said first and second mounting means with respect to each other to carry said blades of each opposed set past those of the other in opposite tangential directions for removing meat from the bones received therebetween.

15. A machine for removing meat from bone and comprising, in combination, a hollow cage, an inner carrier mounted coaxially with and disposed within said cage, means for effecting relative movement between said cage and said inner carrier, a set of leaf spring arms anchored at one end in said cage and projecting inwardly at closely spaced points distributed over the interior of the cage both longitudinally and circumferentially thereof, and a set of leaf spring arms spaced apart around and along said carrier and projecting outwardly from the latter, the leaf spring arms of one said set being offset intermediate their ends and in a direction opposite to said relative movement, each of said spring arms having at its outer end a blade terminating in a combined cutting, tearing and scraping edge disposed adjacent but short of the edges of the inner and outer sets of spring arms.

16. A bone cleaning machine having, in combination, a first mounting means, a first set of elongated spring arms secured at one end in spaced apart relation to the first mounting means, a second mounting means, a second set of elongated spring arms secured at one end in spaced apart relation to the second mounting means, the elongated spring arms of the first and second sets projecting respectively toward but short of each other in opposed relation to define a relatively narrow space between the adjacent free ends thereof which space is adapted by lateral bending of the elongated spring arms to receive therein a succession of bones to be cleaned, a hook carried by the free end of each elongated spring arm and terminating in a blade, the hooks and blades of the two sets of spring arms respectively facing in opposite directions, and means for relatively moving said first and second mounting means with respect to each other in one of said directions to carry the opposed blades past each other for removing meat from the bones received therebetween.

17. A bone cleaning machine having, in combination, a first mounting means, a first set of elongated spring arms secured at one end in spaced apart relation to the first mounting means, a second mounting means, a second set of elongated spring arms secured at one end in spaced apart relation to the second mounting means, the elongated spring arms of the first and second sets projecting respectively toward but short of each other in opposed relation to define a relatively narrow space between the adjacent free ends thereof which space is adapted by lateral bending of the elongated spring arms to receive therein a succession of bones to be cleaned, a blade carried by the free end of each elongated spring arm, the edges of the adjacent blades being oriented perpendicularly with respect to each other and the blades of the two sets of spring arms respectively facing in opposite directions, and means for relatively moving the mounting means with respect to each other in one of said directions to carry the opposed blades past each other for removing meat from the bones received therebetween.

18. A bone cleaning machine having, in combination, a first cylindrical mounting means, a first set of elongated spring arms secured at one end in spaced apart relation to the first cylindrical mounting means and extending inwardly therefrom, a second cylindrical mounting means concentric with the first mounting means, a second set of elongated spring arms secured at one end in spaced apart relation to the second cylindrical mounting means and extending outwardly therefrom, the elongated spring arms of the first and second sets projecting respectively toward but short of each other in opposed relation to define a narrow cylindrical space between the adjacent free ends thereof which space is adapted by lateral bending of the elongated spring arms to receive therein a succession of bones to be cleaned, a blade carried by the free end of each elongated spring arm with the blades of the two sets of spring arms respectively facing circumferentially in opposite directions, and means for relatively rotating the cylindrical mounting means with respect to each other to carry the opposed blades past each other for removing meat from the bones received therebetween.

19. A bone cleaning machine having, in combination, a first cylindrical mounting means, a first set of elongated spring arms secured at one end in spaced apart relation to the first cylindrical mounting means and extending inwardly therefrom, a second cylindrical mounting means concentric with the first mounting means, a second set of elongated spring arms secured at one end in spaced apart relation to the second cylindrical mounting means and extending outwardly therefrom, the elongated spring arms of the first and second sets projecting respectively toward but short of each other to define a narrow cylindrical space between the adjacent free ends thereof which space is adapted by lateral bending of the elongated spring arms to receive therein a succession of bones to be cleaned, a blade carried by the free end of each elongated arm, the edges of the adjacent blades being oriented perpendicularly with respect to each other and the blades of the two sets of spring arms respectively facing in circumferentially opposite directions, and means for relatively rotating the cylindrical mounting means with respect to each other to carry the opposed blades past each other for removing meat from the bones received therebetween.

20. A bone cleaning machine having, in combination, a first cylindrical mounting means, a first set of elongated spring arms secured at one end in spaced apart relation to the first cylindrical mounting means and extending inwardly therefrom, a second cylindrical mounting means concentric with the first mounting means, a second set of spring arms including a plurality of helically arranged elongated spring arms secured at one end to the second cylindrical mounting means and extending outwardly therefrom, the elongated spring arms of the first and second sets projecting respectively toward but short of each other to define a narrow cylindrical space between the adjacent free ends thereof which space is adapted by lateral bending of the elongated spring arms to receive therein a succession of bones to be cleaned, a blade carried by the free end of each elongated spring arm with the blades of the two sets of spring arms respectively facing circumferentially in opposite directions, and means for rotating the second cylindrical mounting means to carry the opposed blades past each other for removing meat from the bones received therebetween and for moving the bones circumferentially and longitudinally along the cylindrical space therebetween.

21. A bone cleaning machine having, in combination, a stationary framework, a stationary cylindrical cage, supported by said stationary framework, a rotor rotatable about an axis common to said rotor and said stationary cylindrical cage, said rotor being supported by said stationary framework, a multiplicity of radially disposed outer spring arms projecting inwardly toward said axis and laterally spaced apart along and around said axis, means on said cage mounting the outer ends of said outer spring arms so as to support the latter in a cantilever fashion, a multiplicity of radially disposed and arranged inner spring arms projecting outwardly from said axis to the positions adjacent but short of said outer arms whereby to provide an annular tubular space between the adjacent ends of said outer and inner spring arms, means on the periphery of said inner rotor mounting the inner end of each of said inner spring arms so as to support the latter cantilever fashion, hooks carried by the adjacent ends of said outer and inner spring arms and terminating in blades which face circumferentially of said axis in opposite directions, and means for turning said rotor in the direction of projection of said inner blades.

22. A machine for cleaning bones having, in combination, a stationary framework, a stationary cylindrical cage supported by said framework, a rotor rotatable about an axis common to said rotor and said cage, said rotor being supported within said cage, a multiplicity of outer spring arms laterally spaced apart around said axis in a transverse direction, means for mounting the outer ends of said outer spring arms on said stationary cage so as to support the latter cantilever fashion, a multiplicity of similarly disposed and arranged inner spring arms projecting toward but short of said outer spring arms to provide between the ends of said inner and outer spring arms an annular space narrower than the bones to be cleaned, means on the periphery of said rotor mounting the inner end of each of said inner spring arms so as to support the latter cantilever fashion, fingers carried by the adjacent ends of said inner and outer spring arms and projecting circumferentially of said axis in opposite directions, oppositely facing blades at the ends of said outer and inner fingers, and means for turning said rotor in the direction of said inner fingers.

23. A machine as defined by claim 22 in which each of said fingers comprises a length of wire flattened at its end to form a blade longer than the diameter of the wire.

24. A machine as defined by claim 22 in which the edges of different blades lie in planes substantially perpendicular to each other.

25. A machine as defined by claim 22 in which the edges of certain of said blades lie in planes angularly spaced from the planes of the other edges.

26. In a machine as defined by claim 22, a cleaning element for removing meat from bones comprising, a spring arm, a substantially U-shaped hook carried by one end of the spring arm and terminating in a finger which is substantially perpendicular to the spring arm, and a blade formed on the end of the finger.

27. In a cleaning apparatus as defined by claim 2 for removing meat from bones, a plurality of spring arms supported at one end, a substantially U-shaped hook carried by the free end of each spring arm and terminating in a finger which is substantially perpendicular to the spring arm, and a blade formed on the end of each finger.

28. A cleaning apparatus for removing meat from bones as defined by claim 2, having a substantially U-shaped hook carried by the free end of a plurality of said spring arms and terminating in a finger which is substantially perpendicular to the spring arm, and a blade formed on the end of each finger, said fingers all facing in the same direction and the adjacent blades being oriented perpendicularly with respect to each other.

29. A cleaning apparatus for removing meat from bones as defined by claim 10, having a substantially U-shaped hook carried by the free end of each of a plurality of said leaf spring arms and terminating in a finger which is substantially parallel to the spring arm, and a blade formed on the end of each finger in substantial alignment with a face of said leaf spring arm.

30. In a bone cleaning machine, the combination comprising a stator, a first set of spring arms each secured at one end in spaced relation on said stator, a rotor, a second set of spring arms each secured at one end on said rotor and having their opposite end portions projecting therefrom in axially spaced rows each said row extending only partially around said rotor circumference, and axially adjacent rows being partially overlapped in a circumferential direction so as to define a flute between said rows extending substantially helically around said rotor.

31. A cleaning apparatus for removing meat from bones as defined by claim 10, wherein a hook is defined on the free end of each of a plurality of said leaf spring arms by a finger which is substantially perpendicular to the leaf spring arm, and a blade is formed on the end of each said finger in substantial alignment with the face of said leaf spring arm.

32. A bone cleaning machine having, in combination, a first mounting means, a first set of leaf spring arms each secured at one end in spaced relation on the first mounting means, a second mounting means, a second set of leaf spring arms each secured at one end in spaced relation on the second mounting means, the elongated spring arms of the first and second sets projecting respectively toward but short of each other to define a relatively narrow space between the adjacent free ends thereof which space is adapted by lateral bending of the spring arms to receive therein a succession of bones to be cleaned, a hook defined on the free end of each said leaf spring arm in said first set and terminating in a finger which is substantially parallel to the leaf spring arm, a blade defined at the free end of each elongated spring arm with the blades of the two sets of spring arms being disposed respectively for engagement in different directions, and means for relatively moving the mounting means with respect to each other in one of said directions to carry the opposed blades past each other for removing meat from the bones received therebetween.

33. A machine for removing meat from bone and comprising, in combination, an outer cylindrical carrier stationarily mounted on a vertical axis, an inner cylindrical carrier disposed within and mounted to turn about the axis of said outer carrier, a first plurality of leaf spring arms anchored at one end in said outer carrier and projecting inwardly at closely spaced points distributed over the interior of the carrier both longitudinally and circumferentially thereof, a second plurality of leaf spring arms spaced apart around and along said inner carrier and projecting outwardly from the latter, a hook defined at the free end of each said leaf spring arm in said first plurality and terminating in a finger which is substantially parallel to the leaf spring arm, a blade defined at the free end of each said leaf spring arm terminating in a combined cutting, tearing and scraping edge disposed adjacent but short of a common cylinder of revolution with the blades of the two pluralities of leaf spring arms being disposed respectively for engagement in different directions, means for loading said machine at the upper end of said carriers, means for discharging cleaned bones adjacent the lower end of said outer carrier, and means for receiving comminuted meat dropping down from said carriers.

34. A machine for removing meat from bone and comprising the combination of an outer cylindrical carrier stationarily mounted on a vertical axis, an inner cylindrical carrier disposed within and mounted to turn about the axis of said outer carrier, a first plurality of leaf spring arms anchored at one end in said outer carrier and projecting inwardly at closely spaced points distributed over the interior of the carrier both longitudinally and circumferentially thereof, a second plurality of leaf spring arms spaced apart around and along said inner carrier and projecting outwardly from the latter, a hook defined at the free end of each said leaf spring arm in said first plurality and terminating in a finger which is substantially parallel to the leaf spring arm, a blade defined at the free end of each said leaf spring arm terminating in a combined cutting, tearing and scraping edge disposed adjacent but short of a common cylinder of revolution with the blades of the two pluralities of leaf spring arms being disposed respectively for engagement in different directions, means including a third plurality of leaf spring arms extending from said inner carrier radially beyond the arms of said second plurality for discharging cleaned bones adjacent the lower end of said outer carrier, and means for receiving comminuted meat dropping down from said carriers.

35. A bone cleaning machine having, in combination, a plurality of bars parallel and angularly spaced around an axis and rigidly joined at their ends to form a stator cage, a plurality of coils of resilient wire spaced along each of said bars and projecting inwardly toward said axis, means anchoring the outer end of each of said coils cantilever fashion to its supporting bar, the wire of each coil being laterally extended beyond the inner coil end to form a hook terminating in a blade facing circumferentially, a generally cylindrical rotor disposed within said stator cage and power rotated about said axis, similar coils of wire anchored at one end to said rotor and projecting radially and outwardly to points short of said blades, said rotor coils having similar hooks at their outer ends terminating in blades which face in a direction opposite to the stator hooks, and means defining an opening for feeding bones radially through said stator cage and against said rotor blades.

36. A machine as defined by claim 35 in which said stator blades are arranged in a row progressing helically around and along said axis.

37. A machine as defined by claim 35 in which said rotor blades are arranged in a row progressing helically around and along said axis.

38. A machine as defined by claim 35 in which said rotor and stator blades are arranged in rows progressing helically along and around said axis.

39. A bone cleaning machine as defined by claim 22 in which said mounting means offers greater resistance to lateral bending of the associated spring arm in one direction than in the opposite direction, both of said directions extending transversely of the direction of relative rotation between the blades.

40. A bone cleaning machine as defined in claim 22 in which said inner spring arms are mounted in a helical groove extending around said rotor, whereby the side walls of said groove limit the bending of said inner spring arms.

41. A bone cleaning machine having, in combination, a first cylindrical mounting means, a first set of spring arms including a plurality of elongated leaf spring arms secured at one end in spaced apart relation to the first cylindrical mounting means and extending inwardly therefrom with their flat sides facing circumferentially laterally, a second cylindrical mounting means concentric with the first mounting means, a second set of spring arms including a plurality of elongated leaf spring arms secured at one end in spaced apart relation to the second cylindrical mounting means and extending outwardly therefrom with their flat sides facing circumferentially laterally, the elongated spring arms of the first and second sets projecting respectively toward but short of each other to define a relatively narrow annular space between the adjacent free ends thereof which space is adapted by circumferential lateral bending of the elongated spring arms to receive therein a succession of bones to be cleaned, a hook formed on the free end of each elongated leaf spring arm and terminating in a blade, the hooks and blades of the two sets of spring arms respectively facing circumferentially in opposite directions, and means for relatively rotating the cylindrical mounting means with respect to each other to carry the opposed blades past each other for removing meat from the bones received therebetween.

42. A bone cleaning machine having, in combination, a first cylindrical mounting means, a first set of spring arms including a plurality of elongated spring arms secured at one end in spaced apart relation to the first cylindrical mounting means and extending inwardly therefrom, a second cylindrical mounting means concentric with the first mounting means, a second set of spring arms including a plurality of elongated spring arms secured at one end in spaced apart relation to the second cylindrical mounting means and extending outwardly therefrom, the elongated spring arms of the first and second sets projecting respectively toward but short of each other to define a narrow cylindrical space between the adjacent free ends thereof which space is adapted by lateral bending of the elongated spring arms to receive therein a succession of bones to be cleaned, a blade carried by the free end of each elongated spring arm with the blades of the two sets of spring arms respectively facing circumferentially in opposite directions, the elongated spring arms of the second set of spring arms being helically arranged about the second cylindrical mounting means along one lead angle, certain of the elongated spring arms of the second set of spring arms being shorter than the remaining spring arms to form a helical progression pattern at the free ends of the spring arms thereof of a larger lead angle, and means for rotating the second cylindrical means to carry the opposed blades past each other for removing meat from the bones received therebetween and to advance the bones longitudinally along the narrow cylindrical space between the two sets of spring arms by reason of said helical arrangement of the spring arms and said helical progression pattern.

43. A bone cleaning machine comprising a stationary framework, a stationary cylindrical cage supported by said stationary framework, a rotor rotatable about an axis common to said rotor and said stationary cylindrical cage, said rotor being supported by said stationary framework, a multiplicity of radially disposed outer spring arms projecting inwardly from the inner periphery of said stationary cylindrical cage toward said axis and laterally spaced apart along and around said axis, means on the periphery of said cage mounting the outer ends of said outer spring arms so as to support the latter cantilever fashion, a multiplicity of similarly disposed and arranged inner spring arms projecting outwardly from said axis to positions adjacent but short of said outer spring arms whereby to provide an annular tubular space between the ends of said inner and outer spring arms, means on the periphery of said rotor mounting the inner end of each of said inner spring arms so as to support the latter cantilever fashion, fingers carried by the adjacent ends of said outer and inner spring arms and projecting therefrom circumferentially of said axis in opposite directions, oppositely facing blades at the ends of said inner and outer fingers, said cage and outer arms being interrupted over a circumferential area to provide an upright passage through which bones may be delivered radially and downwardly into said annular space, and means for turning said rotor in the direction of projection of said inner fingers.

44. In a bone cleaning machine as defined in claim 22, a mounting for said spring arms wherein a portion of each said spring arm is offset from the point at which said spring arm is attached to said rotor whereby to impart to each associated spring arm a greater resistance to lateral bending in one direction than in the opposite direction.

45. In a bone cleaning machine, the combination of a group of spring arms disposed radially of a common axis and laterally spaced apart along and also around said axis, and an annular frame concentric with said group of arms, means on said frame supporting each of said arms cantilever fashion from one of its ends and offering greater resistance to bending of the arm in one direction longitudinally of said axis than in the opposite direction, and a finger on the free end of each of said arms terminating in a blade facing circumferentially around said axis.

46. A bone cleaning machine as defined in claim 22 in which said blades are arranged in a row extending helically around said axis.

47. A bone cleaning machine having, in combination, a stationary framework, an elongated tubular cage stationarily mounted in said framework and having apertures opening radially therethrough, a plurality of resilient radially disposed arms spaced both angularly and longitudinally around the interior of said cage, means anchoring the outer ends of said arms to said cage cantilever fashion, fingers at the free ends of said arms projecting circumferentially around said cage and terminating in narrow blades, a rotor disposed within said cage and mounted in said stationary framework to turn about the axis of said cage, resilient radially disposed arms mounted cantilever fashion on said rotor and spaced both radially and longitudinally of the rotor, fingers at the outer ends of said rotor arms projecting circumferentially of the rotor and terminating in narrow blades, the rotor and stator blades being disposed adjacent each other but spaced radially apart to define a narrow tubular space for receiving a bone by lateral bending of the opposed spring arms according to the contour of the bone, and means for turning said rotor in the direction of projection of the rotor blades to turn the supported bone on its own axis as it is advanced bodily around said tubular space.

48. A bone cleaning machine having, in combination, an outer cylindrical carrier stationarily mounted and apertured for the passage of meat particles outwardly therethrough, an inner cylindrical carrier disposed within and mounted to turn about the axis of said outer carrier, a multiplicity of spring arms anchored at one end in said outer carrier and projecting inwardly at closely spaced points distributed over the interior of the carrier both longitudinally and circumferentially thereof, and a multiplicity of similar spring arms similarly spaced apart around and along said inner carrier and projecting outwardly from the latter, each of said arms having at its free end a laterally extending finger terminating in a combined cutting, tearing and scraping edge disposed adjacent but short of a common cylinder of revolution and the edges of the inner and outer sets of fingers facing circumferentially but in opposite directions.

49. A bone cleaning machine having, in combination, a hollow cage stationarily mounted and apertured for the passage of meat particles outwardly therethrough, an inner carrier disposed within and mounted to turn about the axis of said cage, a multiplicity of spring arms anchored at one end in said cage and projecting inwardly at closely spaced points distributed over the interior of the cage both longitudinally and circumferentially thereof, and a multiplicity of similar spring arms similarly spaced apart around and along said carrier and projecting outwardly from the latter, each of said spring arms having at its outer end a laterally extending finger terminating in a combined cutting, tearing and scraping edge disposed adjacent but short of the edges of the inner and outer sets and facing circumferentially but in opposite directions.

50. A bone cleaning machine having, in combination, two sets of elongated laterally yieldable fingers each having a blade edge at one end, the blade edges of the different sets of fingers facing in opposite directions and disposed concentric with a common axis but spaced apart to receive between them a succession of bones to be cleaned, and means supporting said fingers for relative rotation in one of said directions to carry the opposed blade edges past each other.

51. In a cleaning apparatus for removing meat from bones as defined in claim 10, a substantially U-shaped hook formed on the free end of each of a plurality of said leaf spring arms and terminating in a finger which is substantially perpendicular to the leaf spring arm, and a blade formed on the end of each finger in substantial alignment with a face of the leaf spring arm.

52. In a cleaning apparatus for removing meat from bones as defined in claim 10, a substantially U-shaped hook formed on the free end of each of a plurality of said leaf spring arms and terminating in a finger which is substantially perpendicular to the leaf spring arm, and a blade formed on the end of each finger in substantial alignment with a face of the leaf spring arm, said fingers all facing in the same direction and the adjacent blades being oriented perpendicularly with respect to each other.

53. A bone cleaning machine as defined in claim 10 and having, in combination, a hook defined on the free end of each said leaf spring arm in said first set by a finger which is substantially perpendicular to the leaf spring arm, and another hook defined on the free end of each said leaf spring arm in said second set and terminating in a finger which is substantially parallel to the leaf spring arm, the free end of each said finger terminating in a blade with the blades of the two sets of spring arms respectively facing in different directions.

54. A bone cleaning machine as defined in claim 2, wherein said first and second mounting means are generally frusto-conical in form.

References Cited by the Examiner

UNITED STATES PATENTS

| | | | |
|---|---|---|---|
| 493,454 | 3/1893 | Tobin | 17—5 |
| 1,694,018 | 12/1928 | Mudge et al. | 17—5 |
| 2,734,537 | 2/1956 | Geisler | 17—1 |
| 2,734,540 | 2/1956 | Geisler | 17—45 |
| 2,847,697 | 8/1958 | Bried | 17—11.1 |
| 2,858,222 | 10/1958 | Harris et al. | 99—107 |
| 2,895,162 | 7/1959 | Harris | 17—1 |
| 3,090,073 | 5/1963 | Toti | 17—11.1 |

FOREIGN PATENTS 220,077    3/1910    Germany.

SAMUEL KOREN, *Primary Examiner.*

LUCIE H. LAUDENSLAGER, *Examiner.*